(12) United States Patent
Yarabolu et al.

(10) Patent No.: US 10,848,469 B1
(45) Date of Patent: Nov. 24, 2020

(54) DYNAMIC MULTI-DEVICE AUTHENTICATION AND ACCESS CONTROL SYSTEM

(71) Applicant: Bank of America Corporation, Charlotte, NC (US)

(72) Inventors: Vijay Kumar Yarabolu, Hyderabad (IN); Nagasubramanya Lakshminarayana, Hyderabad (IN)

(73) Assignee: Bank of America Corporation, Charlotte, NC (US)

( * ) Notice: Subject to any disclaimer, the term of this patent is extended or adjusted under 35 U.S.C. 154(b) by 70 days.

(21) Appl. No.: 16/423,648

(22) Filed: May 28, 2019

(51) Int. Cl.
*H04L 29/00* (2006.01)
*H04L 29/06* (2006.01)
*H04L 9/32* (2006.01)
*H04L 9/30* (2006.01)

(52) U.S. Cl.
CPC ........ *H04L 63/0464* (2013.01); *H04L 9/3073* (2013.01); *H04L 9/3226* (2013.01); *H04L 9/3242* (2013.01)

(58) Field of Classification Search
None
See application file for complete search history.

(56) References Cited

U.S. PATENT DOCUMENTS

| | | | |
|---|---|---|---|
| 5,495,533 A | 2/1996 | Linehan et al. | |
| 9,935,954 B2 | 4/2018 | Smadja et al. | |
| 10,057,255 B2 | 8/2018 | Votaw et al. | |
| 10,091,194 B2 | 10/2018 | Votaw et al. | |
| 10,129,228 B1 | 11/2018 | Mobarak et al. | |
| 10,164,983 B2 | 12/2018 | Chen et al. | |
| 10,185,829 B2 | 1/2019 | Sasin et al. | |
| 10,205,713 B2 | 2/2019 | Abdalla et al. | |
| 2013/0251145 A1* | 9/2013 | Lowans | H04L 9/0858 380/44 |
| 2016/0080352 A1* | 3/2016 | Okamoto | H04L 63/061 713/168 |
| 2017/0331817 A1* | 11/2017 | Votaw | H04L 63/0838 |
| 2018/0212970 A1* | 7/2018 | Chen | H04L 63/101 |
| 2018/0295114 A1* | 10/2018 | Abdalla | H04L 9/0844 |

* cited by examiner

*Primary Examiner* — Maung T Lwin
(74) *Attorney, Agent, or Firm* — Banner & Witcoff, Ltd.; Michael A. Springs

(57) ABSTRACT

Arrangements for dynamically authenticating multiple devices in a key network are provided. In some examples, registration information associated with a plurality of devices in a key network may be received. The registration information may include device attributes. Device keys including cross reference data may be generated and transmitted to the plurality of devices. A reference key including one or more starting points for executing one or more hop sequences based on generated hop counts in the reference key may be generated. A first authentication code may also be generated and a hash value of the first authentication code may be stored. Upon receiving a request for authentication, the reference key may be transmitted to the requesting device. The hop sequence(s) may then be executed by one or more of the computing devices in the key network to generate a comparison authentication code. The comparison authentication code may be compared to the first authentication code to determine whether the device(s) may be authenticated.

21 Claims, 24 Drawing Sheets

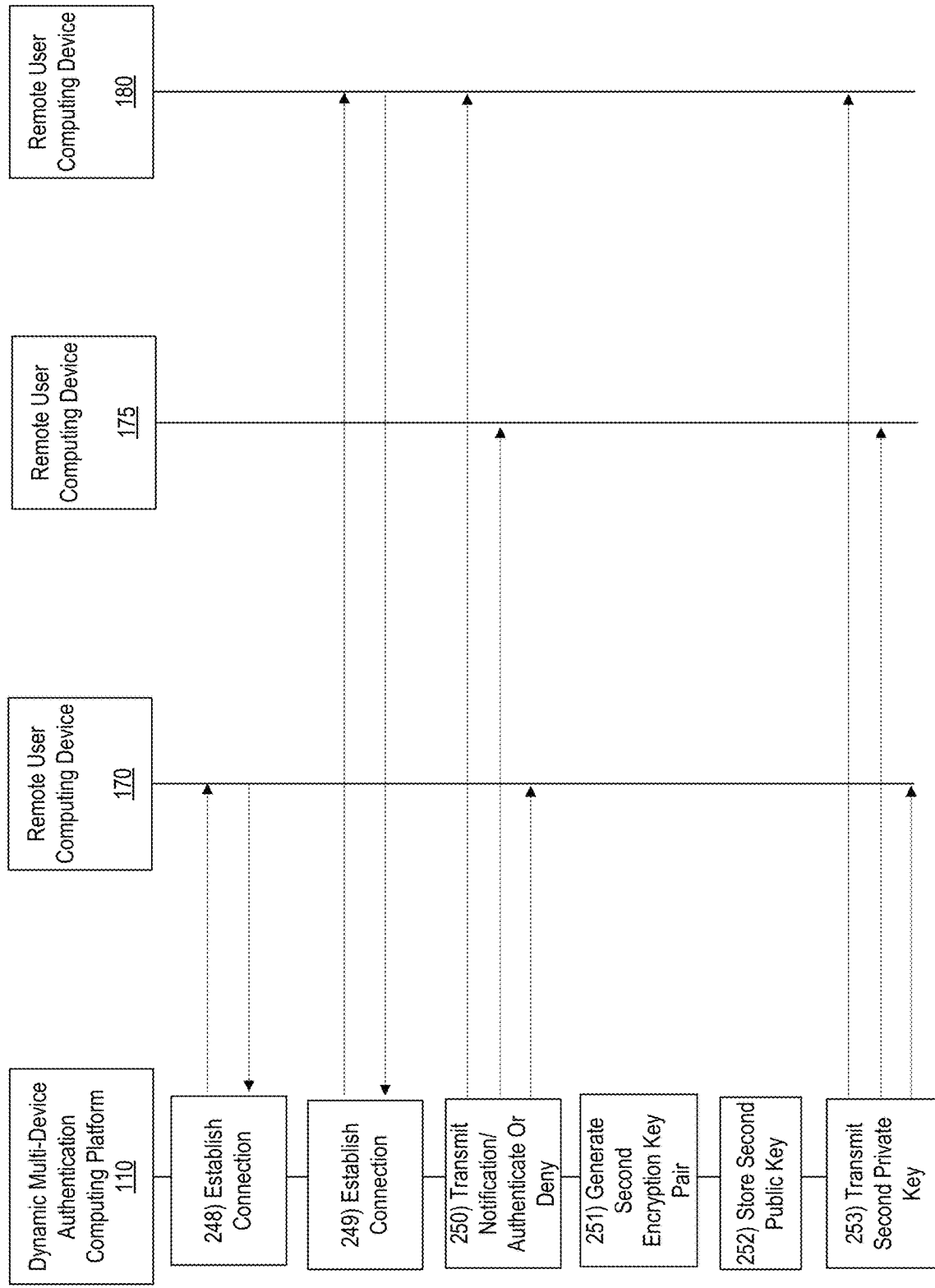

|           | Device 1 ||||| 402 |
|-----------|---------|---------|---------|---------|---------|---|
|           | Cell 0 | Cell 1 | Cell 2 | Cell 3 | Cell 4 | |
| Value     | bf44 | 63ab | af23 | 49d0 | 7bf7 | |
| Reference | Device 3_Cell 4 | Device 3_Cell 0 | Device 2_Cell 0 | Device 3_Cell 3 | Device 4_Cell 3 | |

|           | Device 2 ||||| 404 |
|-----------|---------|---------|---------|---------|---------|---|
|           | Cell 0 | Cell 1 | Cell 2 | Cell 3 | Cell 4 | |
| Value     | 465a | b2ac | 494c | 9cba | dd9e | |
| Reference | Device 3_Cell 1 | Device 4_Cell 4 | Device 2_Cell 0 | Device 1_Cell 2 | Device 1_Cell 4 | |

|           | Device 3 ||||| 406 |
|-----------|---------|---------|---------|---------|---------|---|
|           | Cell 0 | Cell 1 | Cell 2 | Cell 3 | Cell 4 | |
| Value     | b03d | 48d5 | de54 | 12d5 | bec3 | |
| Reference | Device 1_Cell 0 | Device 4_Cell 2 | Device 2_Cell 3 | Device 4_Cell 1 | Device 4_Cell 0 | |

|           | Device 4 ||||| 408 |
|-----------|---------|---------|---------|---------|---------|---|
|           | Cell 0 | Cell 1 | Cell 2 | Cell 3 | Cell 4 | |
| Value     | 6d98 | 59b1 | b496 | 40aa | ddc7 | |
| Reference | Device 2_Cell 3 | Device 1_Cell 1 | Device 2_Cell 2 | Device 3_Cell 2 | Device 2_Cell 4 | |

FIG. 4

| Device/Cell Start | Hop Count |
|---|---|
| D3-C2 | 5 |
| D1-C0 | 6 |
| D4-C1 | 8 |
| D2-C4 | 9 |
| D1-C3 | 7 |
| D3-C0 | 10 |

FIG. 5

DYNAMIC MULTI-DEVICE AUTHENTICATION AND ACCESS CONTROL SYSTEM

BACKGROUND

Aspects of the disclosure relate to electrical computers, systems, and devices for authentication and authorization. In particular, one or more aspects of the disclosure relate to dynamic, multi-device authentication for controlling access to one or more systems.

Protecting user data, personal finances, and thwarting unauthorized activity are priorities for users today. Conventional methods of authentication can be cumbersome and prone to unauthorized access. As the number of devices, applications, and the like requiring authentication increases, conventional systems and arrangements for authentication may be inefficient, time consuming, and susceptible to unauthorized activity. Accordingly, it would be advantageous to provide a dynamic, efficient authentication process.

SUMMARY

The following presents a simplified summary in order to provide a basic understanding of some aspects of the disclosure. The summary is not an extensive overview of the disclosure. It is neither intended to identify key or critical elements of the disclosure nor to delineate the scope of the disclosure. The following summary merely presents some concepts of the disclosure in a simplified form as a prelude to the description below.

Aspects of the disclosure provide effective, efficient, scalable, and convenient technical solutions that address and overcome the technical problems associated with authenticating devices securely and in a simplified manner.

In some examples, registration information associated with a plurality of devices may be received. The plurality of devices may form a key network in which, in some examples, authentication of one device may authenticate all devices. The registration information may include device attributes. In some examples, an encryption key pair may be generated and a public key of the encryption key pair may be stored by a dynamic multi-device authentication computing platform, while the public key may be transmitted to and stored by the plurality of devices in the key network.

In some arrangements, the dynamic multi-device authentication computing platform may generate device keys including cross reference data that may be transmitted to the plurality of devices in the key network. A reference key may be generated and stored by the computing platform. The reference key may include one or more starting points for executing one or more hop sequences based on generated hop counts in the reference key. A first authentication code may also be generated and a hash value of the first authentication code may be stored.

Upon receiving a request for authentication, the computing platform may transmit the public key and reference key to the requesting device. The hop sequence(s) may then be executed by one or more of the computing devices in the key network to obtain a plurality of authentication values. The plurality of authentication values may be used to generate a second authentication code comprising a comparison authentication code. The second authentication code may be compared to the first authentication code to determine whether the device(s) may be authenticated.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which:

FIGS. 2A-2K depict an illustrative event sequence for implementing dynamic multi-device authentication in accordance with one or more aspects described herein;

FIG. 4 illustrates one example cross reference matrix for dynamic multi-device authentication according to one or more aspects described herein;

FIG. 5 illustrates one example reference key for dynamic multi-device authentication according to one or more aspects described herein;

DETAILED DESCRIPTION

Figure 1A:
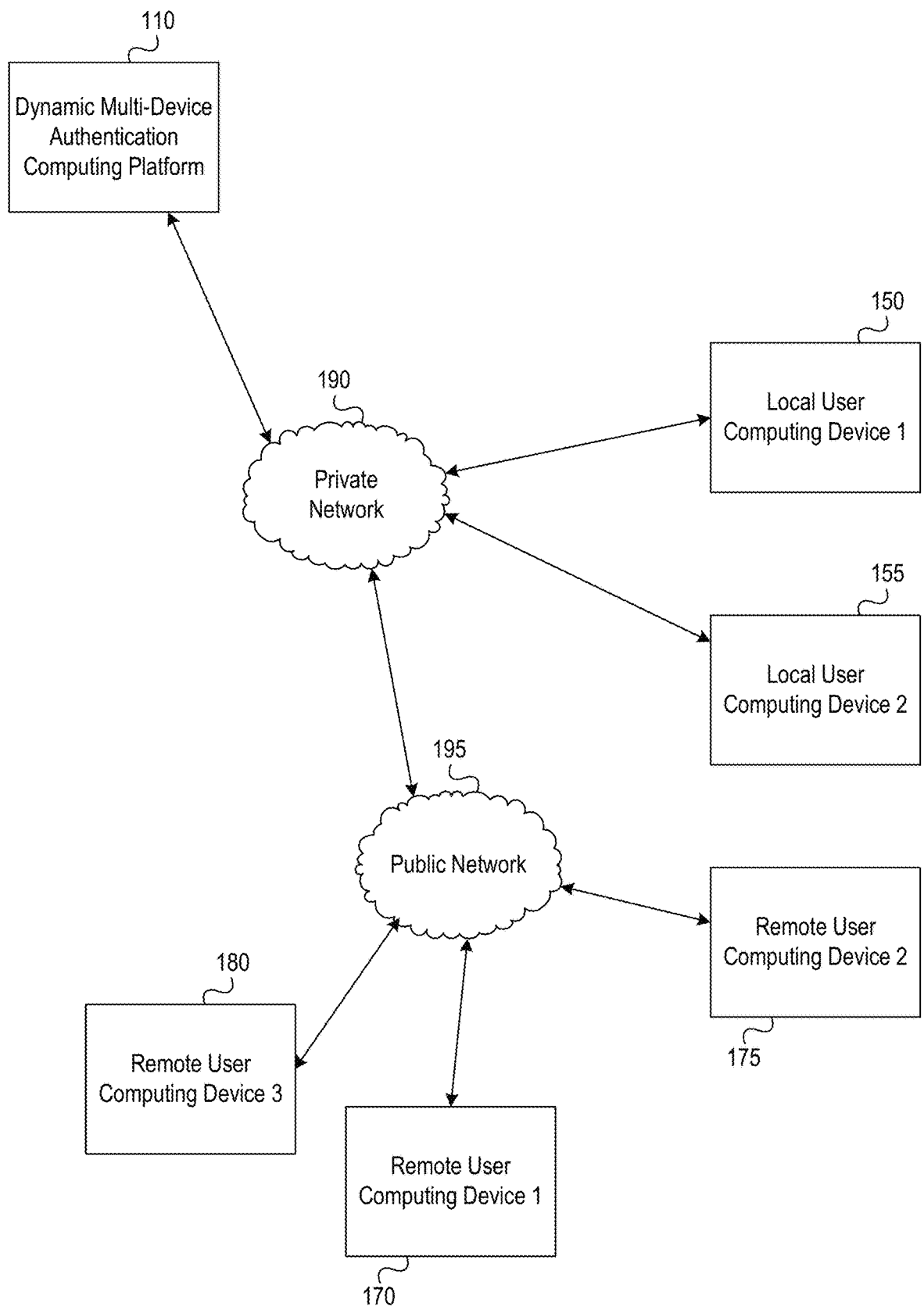
FIGS. 1A and 1B depict an illustrative computing environment for implementing dynamic multi-device authentication in accordance with one or more aspects described herein.

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect.

Some aspects of the disclosure relate to dynamic, multi-device authentication via a single process. As discussed above, as a number of devices, applications, and the like, requiring authentication increases, conventional systems, processes and arrangements become more cumbersome, inefficient, and prone to unauthorized activity.

Accordingly, as discussed more fully herein, aspects herein are directed to authentication of a plurality of devices (e.g., authenticating an application on each device to the plurality of devices, authenticating the plurality of devices to a system, or the like) via a single process. In some examples, a plurality of devices may be identified as a key network of devices. The key network may be dynamic, user-defined and may include any number of devices. In some examples, the key network may include a plurality of devices associated with a user (e.g., smartphone, wearable device, tablet, or the like) or entity (e.g., plurality of smart devices, or the like).

As discussed herein, the process for authentication may include generating an encryption key pair having a public key stored by an authenticating system (e.g., dynamic multi-device authentication system) and a private key stored by the requesting device (e.g., one or more devices in the key network). Further, a cross reference including a plurality of cells or data elements, each including an authentication value and a forward reference cell may be generated. The cross reference may be transmitted to the devices in the key network and stored on the devices. Accordingly, an amount of data being transmitted during authentication may be reduced.

A reference key may be generated. The reference key may include one or more starting points and a number of forward references to hops to execute before capturing an authentication value from the cross reference. The reference key may be transmitted to a device requesting authentication during the authentication process.

The computing platform may generate an authentication code. The authentication code may, in some examples, include a string of values (in some examples, in a particular order) that may be captured from the cross reference by executing the hop counts. The authentication code may be stored by the computing platform for comparison with a comparison authentication code generated by the requesting device of the devices in the key network.

Accordingly, a device in the key network may request authentication. Upon requesting authentication, the public key and reference key may be transmitted to the requesting device. The requesting device may execute the hop counts in the reference key to capture a plurality of authentication values from the cross reference. These values may be used to generate a comparison authentication code that may be transmitted to the computing platform for comparison and authentication.

These and various other arrangements will be discussed more fully below.

Figure 1B:
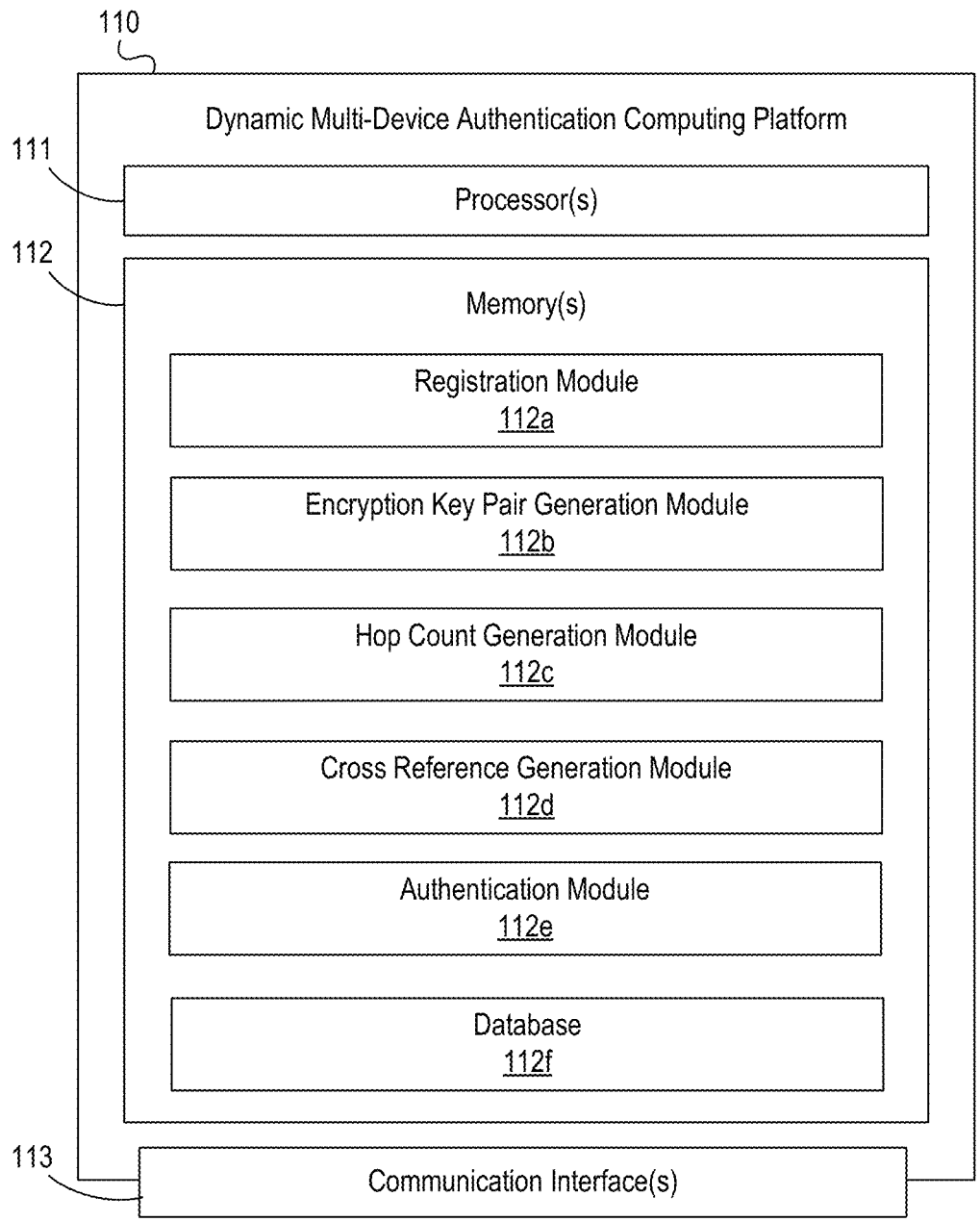

FIGS. 1A and 1B depict an illustrative computing environment for implementing and using a system for dynamic, multi-device authentication in accordance with one or more aspects described herein. Referring to FIG. 1A, computing environment 100 may include one or more computing devices and/or other computing systems. For example, computing environment 100 may include dynamic, multi-device authentication computing platform 110, a first local user computing device 150, a second local user computing device 155, a first remote user computing device 170, a second remote user computing device 175, and a third remote user computing device 180. Although three remote user computing devices are shown in FIG. 1A, more or fewer devices may be used without departing from the invention.

Dynamic multi-device authentication computing platform 110 may be configured to provide intelligent, dynamic authentication for a plurality of devices using a single process. For instance, dynamic multi-device authentication computing platform 110 may receive registration information from a plurality of computing devices. The plurality of computing devices may comprise or be part of a key network in which authentication of one device or one application or other aspect of the device may authenticate all devices (or applications on all devices) within the key network. In some examples, the plurality of computing devices in the key network may be associated with a particular user, entity, or the like. In some examples, the registration information may include device details associated with each device within the key network or for which registration is requested.

Upon receiving registration information, a first encryption key pair may be generated. In some examples, the public key may be stored by the dynamic multi-device authentication computing platform 110 and the private key(s) may be transmitted to each computing device registered in the key network.

The dynamic multi-device authentication computing platform may generate device keys with cross reference information. The device keys with cross reference information may include a matrix of data based on the devices within the key network. Each element or cell within the matrix may include an authentication value and a forward reference value. The device keys with cross reference may then be transmitted to each computing device of the plurality of computing devices within the key network.

The dynamic multi-device authentication computing platform 110 may then generate a reference key that may be stored by the dynamic multi-device authentication computing platform 110 until a request for authentication is received. The dynamic multi-device authentication computing platform 110 may then generate a first authentication code. The first authentication code may be comprised of values from the generated matrix and may be converted to a hash value and stored.

Upon receiving a request for authentication, the dynamic multi-device authentication computing platform 110 may then transmit the public key and generated reference key to the requesting computing device. The requesting computing device may execute the hop counts in the reference key using the generated matrix to identify values to comprise a comparison authentication code. The generated comparison authentication code may then be transmitted to the dynamic multi-device authentication computing platform and, if a match exists, the devices, applications, or the like may be authenticated. In some examples, upon determining whether a match exists, the generated encryption keys, reference keys, and the like, may be deleted and subsequent keys may be generated and stored for a subsequent authentication request.

Local user computing device 150, 155 and remote user computing device 170, 175, 180 may be configured to communicate with and/or connect to one or more computing devices or systems shown in FIG. 1A. For instance, local user computing device 150, 155 may communicate with one or more computing systems or devices via network 190, while remote user computing device 170, 175, 180 may communicate with one or more computing systems or devices via network 195. In some examples, local user computing device 150, 155 may be used to access one or more entity systems, functions or processes. In some examples, local user computing device 150, 155 may be used to access the dynamic multi-device authentication computing platform 110 to control parameters of the system, update or execute rules, modify settings, display notifications, and the like.

The remote user computing devices 170, 175, 180 may be used to communicate with, for example, dynamic multi-device authentication computing platform 110. For instance, remote user computing devices 170, 175, 180 may include user computing devices, such as mobile devices including smartphones, tablets, laptop computers, wearable devices, fitness trackers, and the like, to which a user may be authenticated and/or for which authentication may be required to access functionality of the device.

In one or more arrangements, local user computing device 150, local user computing device 155, remote user computing device 170, remote user computing device 175, and/or remote user computing device 180 may be any type of computing device or combination of devices configured to perform the particular functions described herein. For example, local user computing device 150, local user computing device 155, remote user computing device 170, remote user computing device 175, and/or remote user computing device 180 may, in some instances, be and/or include server computers, desktop computers, laptop computers, tablet computers, smart phones, or the like that may include one or more processors, memories, communication interfaces, storage devices, and/or other components. As noted above, and as illustrated in greater detail below, any and/or all of local user computing device 150, local user computing device 155, remote user computing device 170, remote user computing device 175, and/or remote user computing device 180 may, in some instances, be special-purpose computing devices configured to perform specific functions.

Computing environment 100 also may include one or more computing platforms. For example, and as noted above, computing environment 100 may include dynamic multi-device authentication computing platform 110. As illustrated in greater detail below, dynamic multi-device authentication computing platform 110 may include one or more computing devices configured to perform one or more of the functions described herein. For example, dynamic multi-device authentication computing platform 110 may include one or more computers (e.g., laptop computers, desktop computers, servers, server blades, or the like).

As mentioned above, computing environment 100 also may include one or more networks, which may interconnect one or more of dynamic multi-device authentication computing platform 110, local user computing device 150, local user computing device 155, remote user computing device 170, remote user computing device 175, and/or remote user computing device 180. For example, computing environment 100 may include private network 190 and public network 195. Private network 190 and/or public network 195 may include one or more sub-networks (e.g., Local Area Networks (LANs), Wide Area Networks (WANs), or the like). Private network 190 may be associated with a particular organization (e.g., a corporation, financial institution, educational institution, governmental institution, or the like) and may interconnect one or more computing devices associated with the organization. For example, dynamic multi-device authentication computing platform 110, local user computing device 150, and local user computing device 155, may be associated with an organization (e.g., a financial institution), and private network 190 may be associated with and/or operated by the organization, and may include one or more networks (e.g., LANs, WANs, virtual private networks (VPNs), or the like) that interconnect dynamic multi-device authentication computing platform 110, local user computing device 150, local user computing device 155, and one or more other computing devices and/or computer systems that are used by, operated by, and/or otherwise associated with the organization. Public network 195 may connect private network 190 and/or one or more computing devices connected thereto (e.g., dynamic multi-device authentication computing platform 110, local user computing device 150, local user computing device 155) with one or more networks and/or computing devices that are not associated with the organization. For example, remote user computing device 170, remote user computing device 175, remote user computing device 180 might not be associated with an organization that operates private network 190 (e.g., because remote user computing device 170, remote user computing device 175, remote user computing device 180 may be owned, operated, and/or serviced by one or more entities different from the organization that operates private network 190, such as a second entity different from the entity, one or more customers of the organization, one or more employees of the organization, public or government entities, and/or vendors of the organization, rather than being owned and/or operated by the organization itself), and public network 195 may include one or more networks (e.g., the internet) that connect remote user computing device 170, remote user computing device 175, remote user computing device 180, to private network 190 and/or one or more computing devices connected thereto (e.g., dynamic multi-device authentication computing platform 110, local user computing device 150, local user computing device 155).

Referring to FIG. 1B, dynamic multi-device authentication computing platform 110 may include one or more processors 111, memory 112, and communication interface 113. A data bus may interconnect processor(s) 111, memory 112, and communication interface 113. Communication interface 113 may be a network interface configured to support communication between dynamic multi-device authentication computing platform 110 and one or more networks (e.g., private network 190, public network 195, or the like). Memory 112 may include one or more program modules having instructions that when executed by processor(s) 111 cause dynamic multi-device authentication computing platform 110 to perform one or more functions described herein and/or one or more databases that may store and/or otherwise maintain information which may be used by such program modules and/or processor(s) 111. In some instances, the one or more program modules and/or databases may be stored by and/or maintained in different memory units of dynamic multi-device authentication computing platform 110 and/or by different computing devices that may form and/or otherwise make up dynamic multi-device authentication computing platform 110.

For example, memory 112 may have, store and/or include a registration module 112a. Registration module 112a may store instructions and/or data that may cause or enable the dynamic multi-device authentication computing platform 110 to receive registration information for one or more devices (e.g., devices in a key network), such as remote user computing device 170, remote user computing device 175, remote user computing device 180, and the like. For instance, a user may be a customer or employee of an entity implementing the dynamic multi-device authentication computing platform 110 (e.g., a financial institution, government entity, corporation, or the like) having a plurality of devices comprising a key network. Registration information, such as name, contact information, device identifying information (e.g., IMEI), application identifying information (e.g., type, version, or the like) and the like may be provided. In some examples, the registration information may include data associated with device details from each device of a plurality of devices being registered in a key network.

Additional types of data may be obtained via the registration process without departing from the invention.

The registration information may be received by the registration module 112a and a registration record may be generated (e.g., a new key network event may be registered, a new device may be added to a key network, or the like).

The registration record may be generated in a data structure and adding the record may modify the data structure. The registration information may then be stored (e.g., pre-stored in advance of using information for authentication) and may be used to authenticate the user according to one or more aspects described herein.

Dynamic multi-device authentication computing platform 110 may further have, store and/or include an encryption key pair generation module 112*b*. Encryption key pair generation module 112*b* may store instructions and/or data that may cause or enable the dynamic multi-device authentication computing platform 110 to generate an encryption key pair including, for example, a public key and a private key. In some arrangements, the public key may be stored by the dynamic multi-device authentication computing platform 110, such as in database 112*f*. The private key may be transmitted to one or more user devices (e.g., devices within the key network), such as remote user computing device 170, remote user computing device 175, remote user computing device 180, or the like, and stored by the device.

Dynamic multi-device authentication computing platform 110 may further have, store and/or include cross reference generation module 112*d*. Cross reference generation module 112*d* may store instructions and/or data that may cause or enable the dynamic multi-device authentication computing platform 110 to generate device keys with cross reference information. For instance, the cross reference generation module 112*b* may generate one or more device keys with cross reference information. This information may include a matrix including device data and having a plurality of cells or data elements associated with each device. Each element or cell may include a designated value (e.g., authentication value) and a forward reference value including a device and associated cell. The authentication values to be used to generate a comparison authentication code may be captured based on a generated hop count and used to authenticate the plurality of devices. The cross reference generation module 112*d* may generate device keys with cross reference and transmit the generated device keys to the one or more user devices within the key network, such as remote user computing device 170, remote user computing device 175, remote user computing device 180, for storage.

The cross reference generation module 112*d* may further store instructions and/or data that may cause or enable the dynamic multi-device authentication computing platform 110 to generate a corresponding reference key. The corresponding reference key may include a reference key associated with the generated device keys with cross reference information. The generated reference key may be stored by the dynamic multi-device authentication computing platform 110, such as in database 112*f*. In some examples, the generated reference key may include a hop count generated by hop count generation module 112*c*, starting point for executing the hop counts, and the like, as discussed herein.

Dynamic multi-device authentication computing platform 110 may further have, store and/or include a hop count generation module 112*c*. Hop count generation module 112*c* may store instructions and/or data that may cause or enable the dynamic multi-device authentication computing platform 110 to dynamically generate a hop count for use in authenticating the plurality of user devices, such as remote user computing device 170, remote user computing device 175, and the like. The hop count may include a number of forward references to complete before capturing an authentication value from a particular cell. The hop count may be randomly generated and may change with everything authentication process or request.

Dynamic multi-device authentication computing platform 110 may further have, store and/or include an authentication module 112*e*. Authentication module 112*e* may store instructions and/or data that may cause or enable the dynamic multi-device authentication computing platform 110 to perform multiple authentication processes. For instance, authentication module 112*e* may generate one or more authentication codes. In some examples, the authentication codes may include a plurality or string of values (e.g., each value associated with a cell for a particular device in the generated cross reference information). The values may be alphanumeric and, in some examples, may be used in a particular order to comprise an authentication code. The authentication code may be generated for a single use and then deleted and a subsequent code may be generated. In some examples, the authentication code may be generated by executing the generated hop count or the authentication code may be generated from known values and the hop count may be generated based on the generated authentication code (e.g., may be generated to correspond to capturing values in an appropriate order by a computing device to generate a comparison authentication code which may be compared to the generated authentication code). The generated authentication code may be converted to a hash value and stored for comparison to a comparison authentication code received during an authentication process.

Authentication module 112*e* may further receive a request to authenticate one or more devices, applications executing on the devices, or the like of the plurality of devices in the key network. In some examples, the request to authenticate the one or more devices may include a generated comparison authentication code generated by one or more devices of the plurality of user devices based on the generated reference key and matrix. The comparison authentication code may be generated by executing (e.g., by the device requesting authentication) a sequence based on the generated hop count and capturing values in each of the cells associated with a device based on the hop count and starting points in the reference key. The values may be converted to a hash value and transmitted to the authentication module 112*e*. The authentication module 112*e* may receive the hash value and retrieve the stored hash value of the generated authentication code. The received hash value may be compared to the retrieved hash value to determine whether a match exists. If so, the device, or plurality of devices (e.g., in some examples, all user devices) may be authenticated. If not, a notification may be transmitted to the user denying authentication.

In some examples, after a user is authenticated or the requested authentication is denied, the generated device keys with cross reference and/or reference key may be deleted and new device keys with cross reference and/or reference keys may be generated. In some examples, the newly generated device keys and reference key may include new, dynamically generated hop counts which may modify values needed to authenticate the devices.

FIGS. 2A-2K depict one example illustrative event sequence for implementing and using dynamic, multi-device authentication in accordance with one or more aspects described herein. The events shown in the illustrative event sequence are merely one example sequence and additional events may be added, or events may be omitted, without departing from the invention.

Figure 2A:
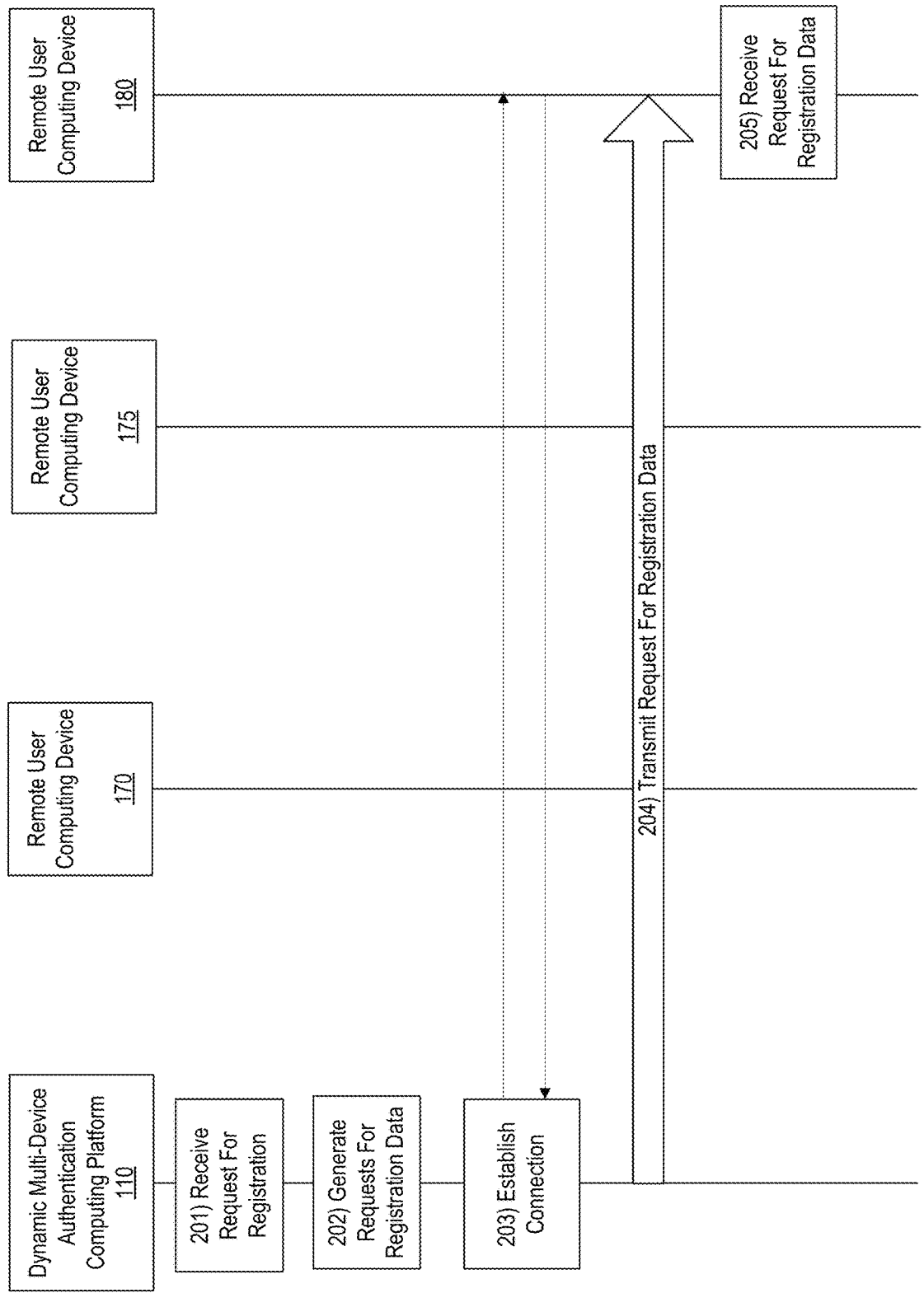

Referring to FIG. 2A, at step 201, a request for registration may be received by a dynamic multi-device authentication computing platform 110. In some examples, the request for registration may be received from one computing device of a plurality of computing devices associated with a particular user, entity, or the like. The plurality of computing devices may be part of or comprise a key network in which authentication of all devices (or applications executing on all devices within the key network) via a single sign-on, as is discussed more fully herein, is desired. In some examples, receiving the request for registration may include activating, initiating or otherwise enabling dynamic multi-device authentication functions that were previously disabled, or the like.

At step 202, a request for registration data may be generated. In some examples, the request for registration data may include one or more device attributes (e.g., type of device, unique identifier associated with the device, or the like).

At step 203, a connection may be established between the dynamic multi-device authentication computing platform 110 and remote user computing device 180. For instance, a first wireless connection may be established between the remote user computing device 180 and the dynamic multi-device authentication computing platform 110. Upon establishing the first wireless connection, a communication session may be initiated between the remote user computing device 180 and the dynamic multi-device authentication computing platform 110.

At step 204, the request for registration data may be transmitted to the remote user computing device 180. For instance, the request for registration data may be transmitted during the communication session established upon initiating the first wireless connection.

At step 205, the request for registration data may be received by the remote user computing device 180 and processed. In some examples, processing the received request may include extracting requested data (e.g., device identifying data, application identifying data, and the like).

Figure 2B:
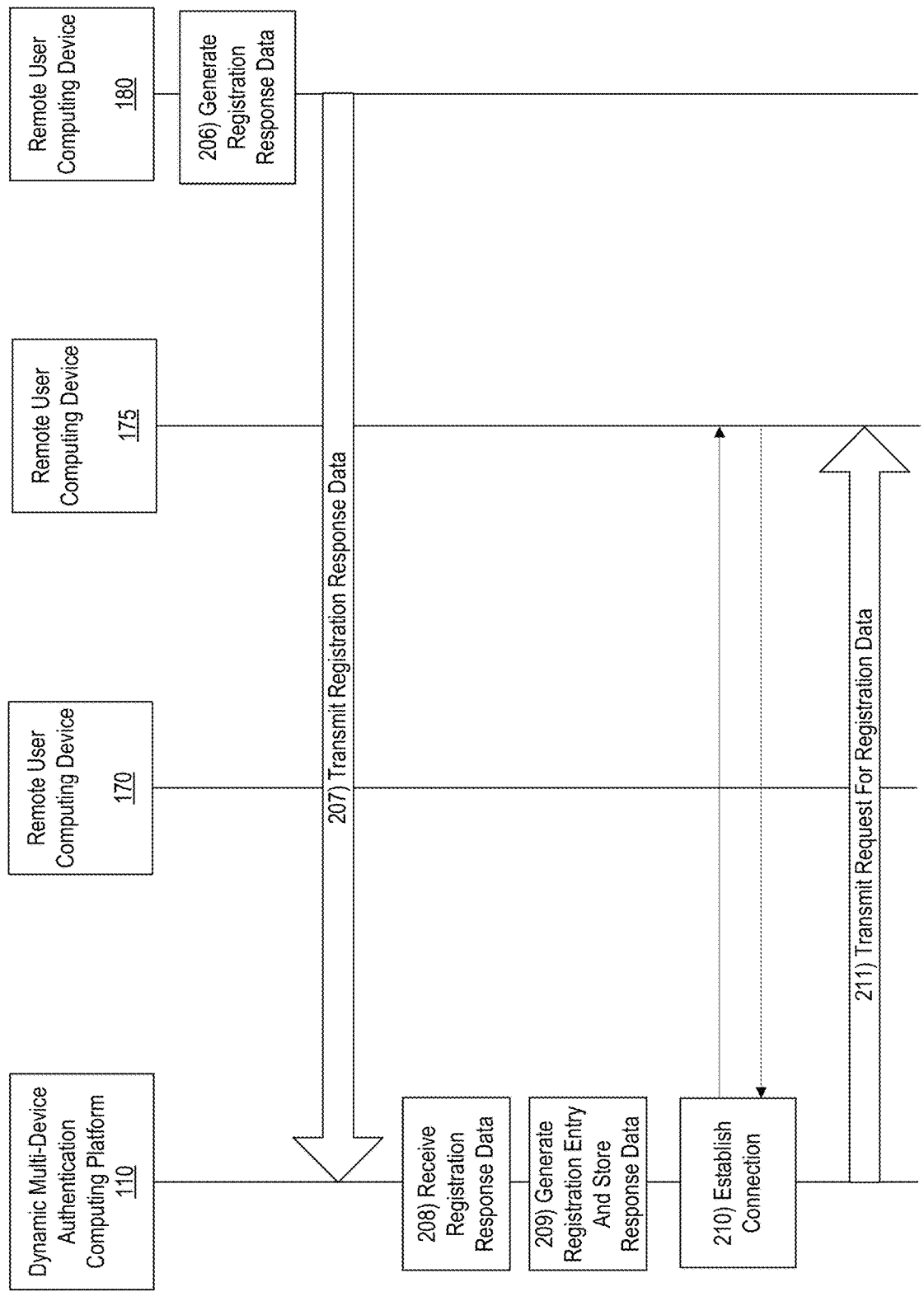

With reference to FIG. 2B, at step 206, registration response data may be generated by the remote user computing device 180. For instance, the extracted requested data may be used to generate registration response data. At step 207, the registration response data may be transmitted from the remote user computing device 180 to the dynamic multi-device authentication computing platform 110.

At step 208, the registration response data may be received by the dynamic multi-device authentication computing platform 110. At step 209, the received registration response data may be processed and a device or key network registration entry may be generated. For instance, if this is the first device of a plurality of devices being registered, a new key network entry may be generated and the registration response data may be stored in the new entry. Additionally or alternatively, if the device is a new device being added to an existing key network, a new device entry may be generated in association with an existing key network.

At step 210, a connection may be established between the dynamic multi-device authentication computing platform 110 and remote user computing device 175. For instance, a second wireless connection may be established between the remote user computing device 175 and the dynamic multi-device authentication computing platform 110. Upon establishing the second wireless connection, a communication session may be initiated between the remote user computing device 175 and the dynamic multi-device authentication computing platform 110.

At step 211, the request for registration data may be transmitted to the remote user computing device 175. For instance, the request for registration data may be transmitted during the communication session established upon initiating the second wireless connection.

Figure 2C:
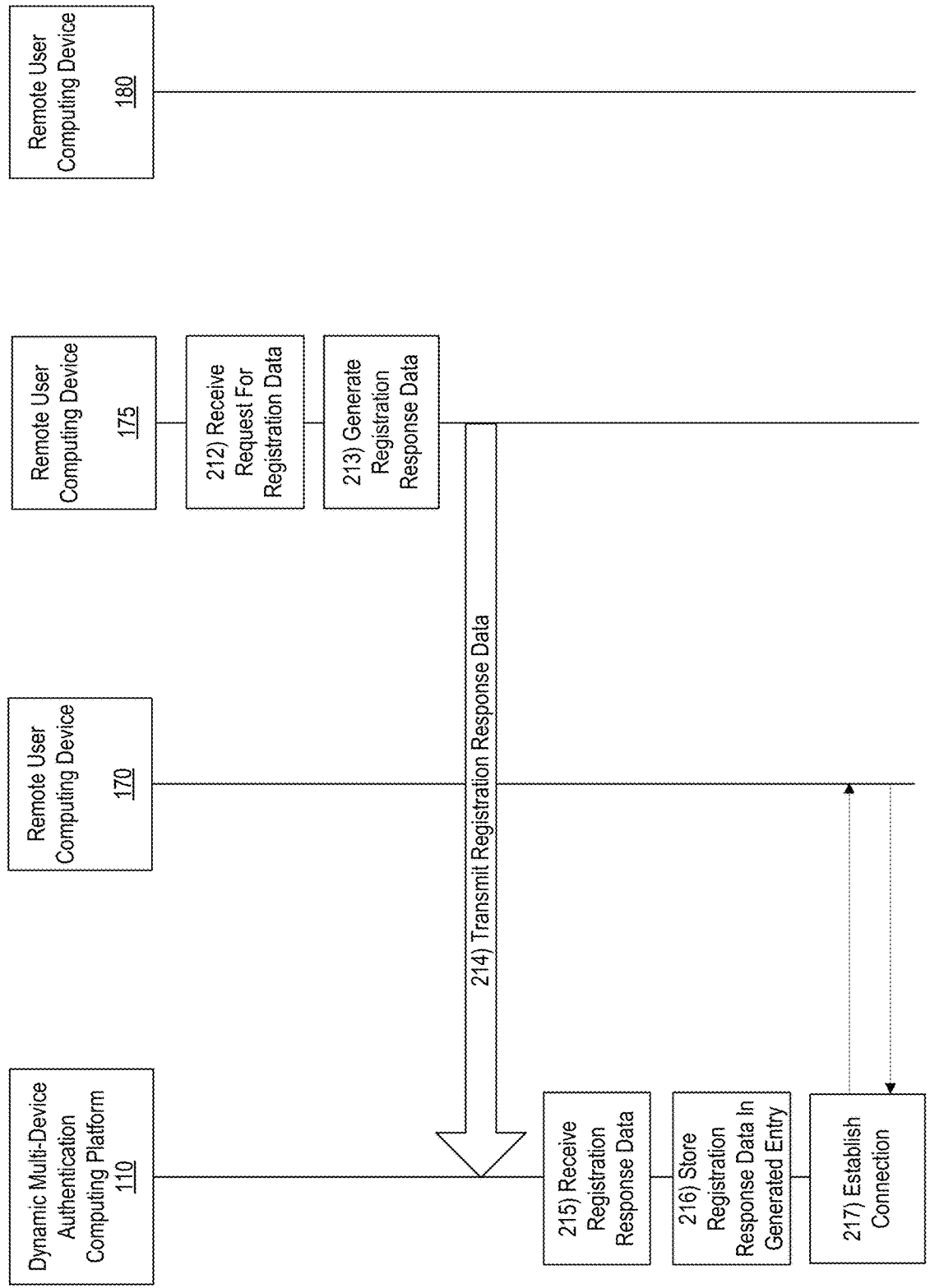

With reference to FIG. 2C, at step 212, the request for registration data may be received by the remote user computing device 175 and processed. In some examples, processing the received request may include extracting requested data (e.g., device identifying data, application identifying data, or the like).

At step 213, registration response data may be generated by the remote user computing device 175. For instance, the extracted requested data may be used to generate registration response data. At step 214, the registration response data may be transmitted from the remote user computing device 175 to the dynamic multi-device authentication computing platform 110.

At step 215, the registration response data may be received by the dynamic multi-device authentication computing platform 110. At step 216, the received registration response data may be stored in the previously generated key network entry as an additional or new device. Accordingly, the registration response data registering remote user computing device 175 may be stored in association with registration response data registering remote user computing device 180 within the same key network.

At step 217, a connection may be established between the dynamic multi-device authentication computing platform 110 and remote user computing device 170. For instance, a third wireless connection may be established between the remote user computing device 170 and the dynamic multi-device authentication computing platform 110. Upon establishing the third wireless connection, a communication session may be initiated between the remote user computing device 170 and the dynamic multi-device authentication computing platform 110.

Figure 2D:
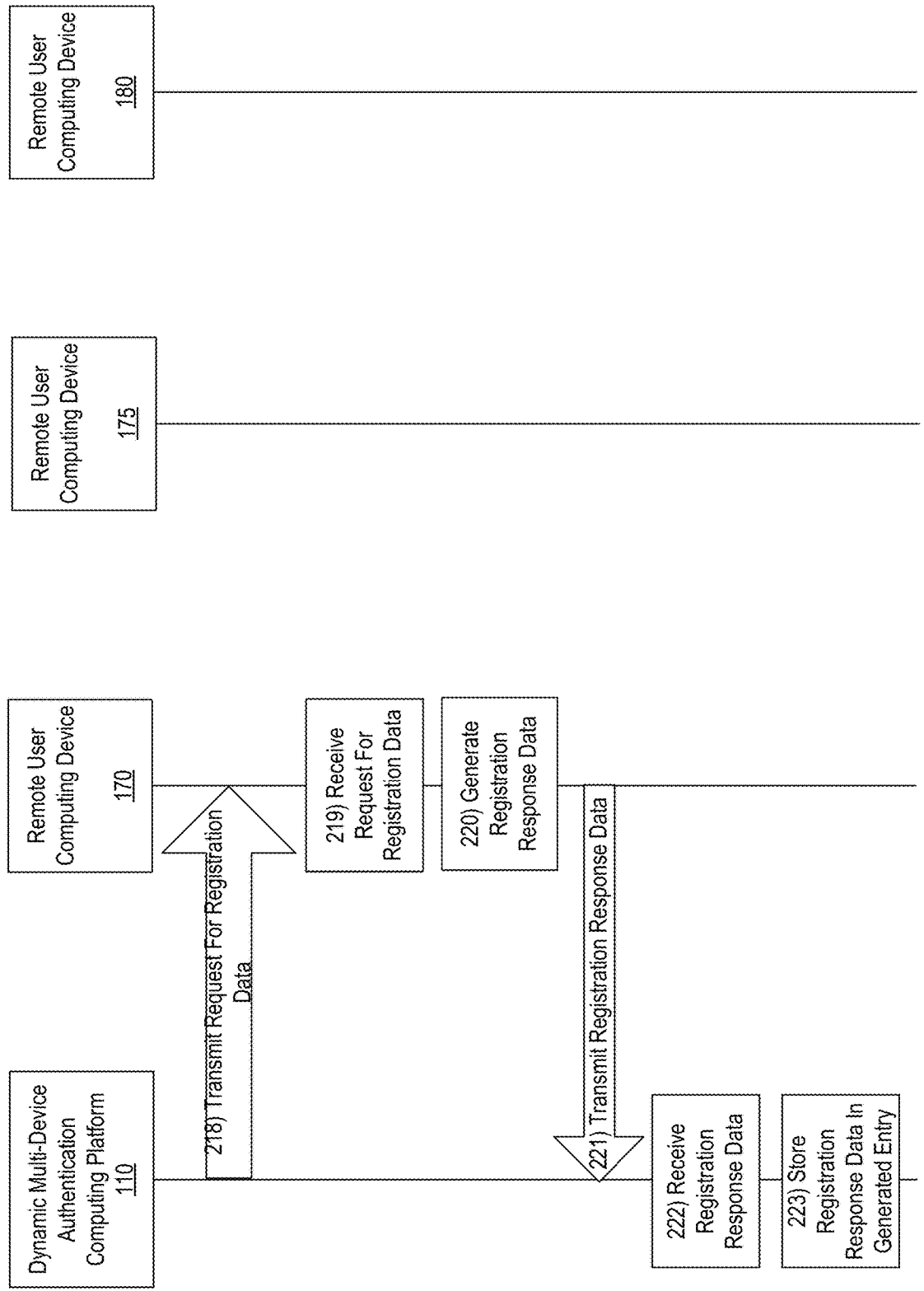

With reference to FIG. 2D, at step 218, the request for registration data may be transmitted to the remote user computing device 170. For instance, the request for registration data may be transmitted during the communication session established upon initiating the third wireless connection.

At step 219, the request for registration data may be received by the remote user computing device 170 and processed. In some examples, processing the received request may include extracting requested data (e.g., device identifying data, application identifying data, or the like).

At step 220, registration response data may be generated by the remote user computing device 170. For instance, the extracted requested data may be used to generate registration response data. At step 221, the registration response data may be transmitted from the remote user computing device 170 to the dynamic multi-device authentication computing platform 110.

At step 222, the registration response data may be received by the dynamic multi-device authentication computing platform 110. At step 223, the received registration response data may be stored in the previously generated key network entry as an additional or new device. Accordingly, the registration response data registering remote user computing device 170 may be stored in association with registration response data registering remote user computing device 180 and remote user computing device 175 within the same key network.

Although three remote user computing devices are shown and described, more or fewer devices may be used without departing from the invention. Accordingly, in some examples, registration information or data may be requested from each computing device in a particular key network (e.g., all devices associated with a user, entity, or the like) for which registration and multi-device authentication is being requested.

Figure 2E:
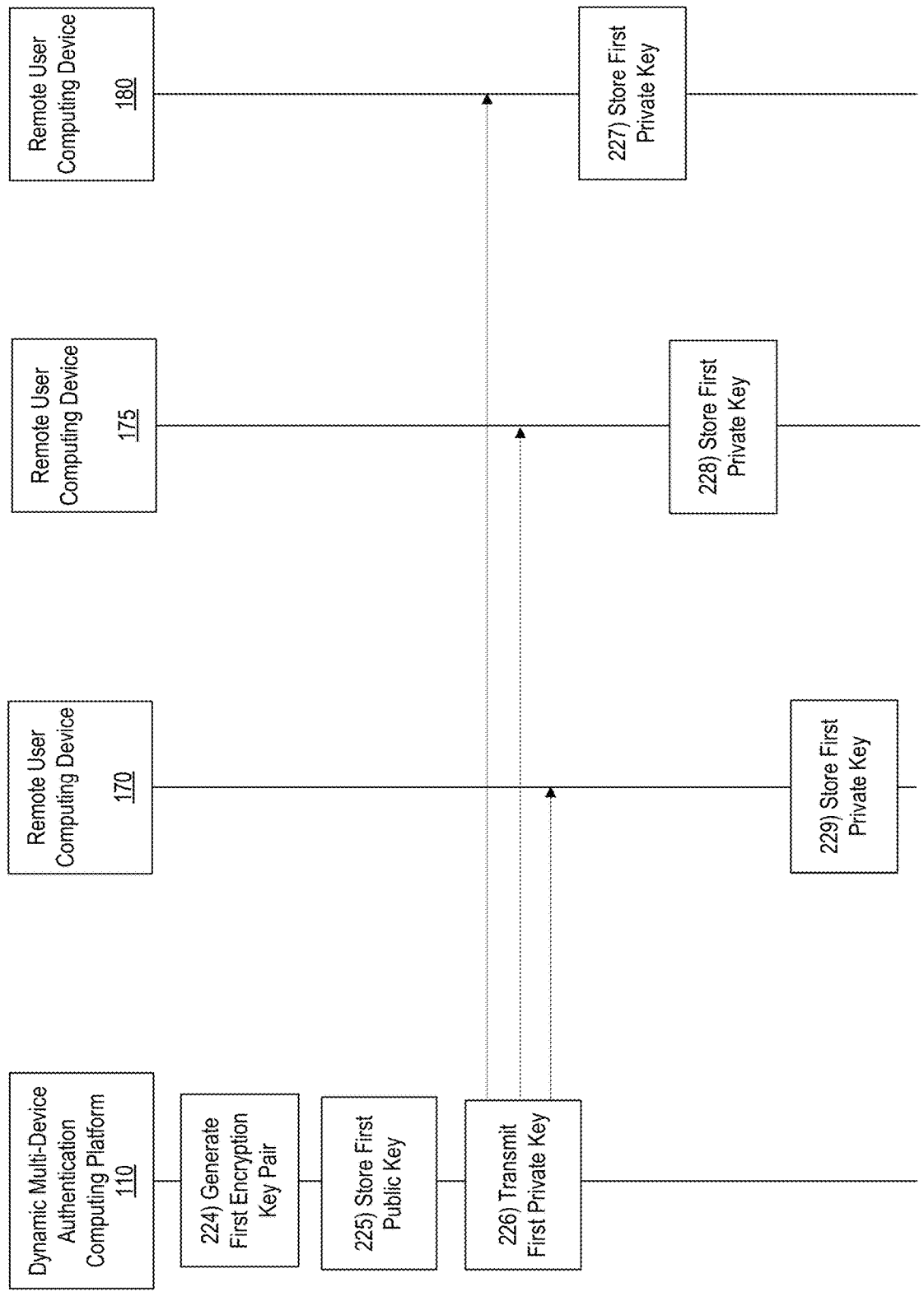

With reference to FIG. 2E, at step 224, a first encryption key pair may be generated by the dynamic multi-device authentication computing platform 110. For instance, a first encryption key pair including a public key and private key may be generated. In some examples, both keys may be required in order to authenticate a user to one or more devices.

At step 225, the public key of the first encryption key pair (e.g., first public key) may be stored by the dynamic multi-device authentication computing platform 110. At step 226, the private key of the first encryption key pair (e.g., first private key) may be transmitted to each computing device of the plurality of computing devices in the key network. For example, the first private key may be transmitted to each computing device for which registration information or data was received (e.g., remote user computing device 170, remote user computing device 175, remote user computing device 180, and the like).

At step 227, the first private key may be received by the remote user computing device 180 and stored. At step 228, the first private key may be received by the remote user computing device 175 and stored. At step 229, the first private key may be received by the remote user computing device 170 and stored.

Figure 2F:
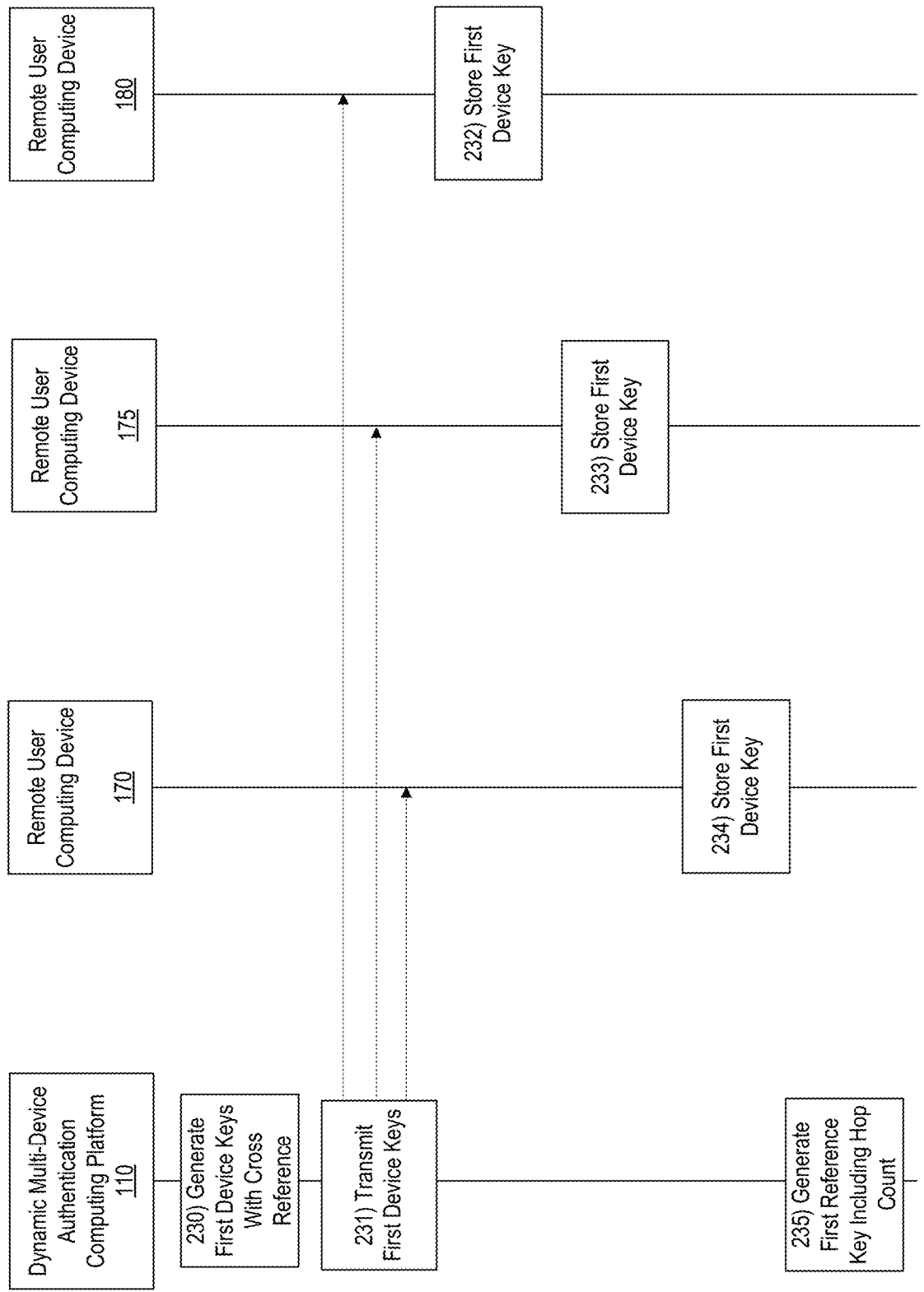

With reference to FIG. 2F, at step 230, first device keys with cross reference may be generated. For instance, a matrix including device data and having a plurality of cells or data elements associated with each device may be generated. In some examples, each element or cell may include an authentication value and a forward reference value identifying a device and associated cell to which the system should advance when executing a hop count. As is discussed more fully herein, the values may be captured upon executing a particular hop count and may be used to authenticate the plurality of devices. The first device keys may include cross reference data associated with each device (e.g., cells having authentication values and forward references for each device). In some examples, first device keys including cross reference data for all devices may be transmitted to each remote user computing device (e.g., remote user computing device 170, remote user computing device 175, remote user computing device 180). Additionally or alternatively, first device keys transmitted to each device may include cross reference data for the respective device. In some examples, first device keys for each device may include cross reference data for only the respective device to which it is being transmitted and with which it is associated.

At step 231, the first device keys may be transmitted to each computing device within the key network. For instance, the first device keys may be transmitted from the dynamic multi-device authentication computing platform 110 to each of remote user computing device 170, remote user computing device 175, and remote user computing device 180.

At step 232, the first device key may be received by remote user computing device 180 and stored. At step 233, the first device key may be received by remote user computing device 175 and stored. At step 234, the first device key may be received by remote user computing device 170 and stored.

At step 235, a first reference key including a generated hop count and starting points for executing a hop sequence may be generated. The hop count may include a number of forward references to complete before capturing am authentication value from a particular cell. The starting point may include a device and corresponding cell at which to begin execution of the hop count. In some examples, a hop sequence may be executed to generate a comparison authentication code (e.g., based on values in a plurality of cells associated with the plurality of devices).

Figure 2G:
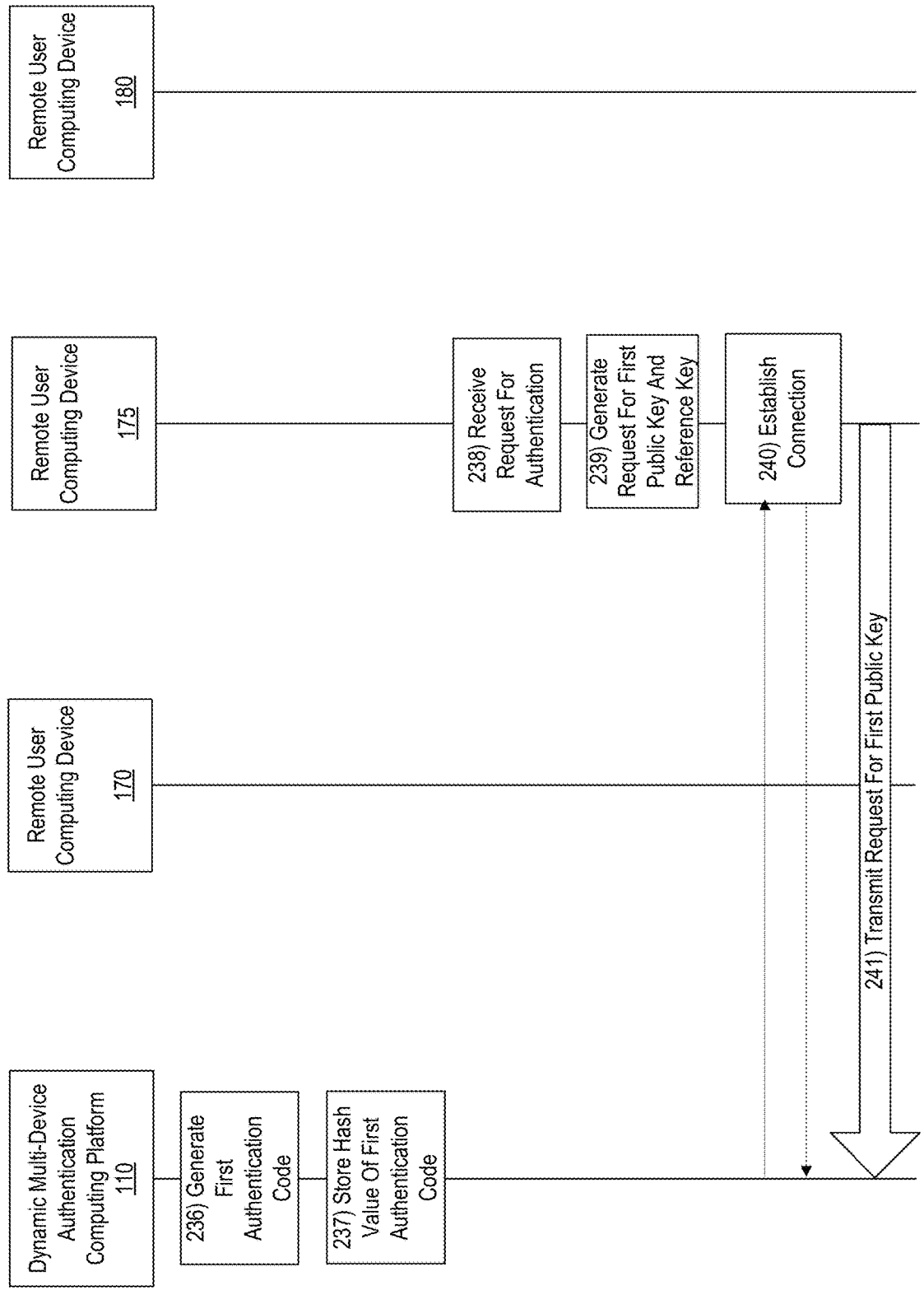

For instance, with reference to FIG. 2G, at step 236, a first authentication code may be generated. In some examples, the first authentication code may be generated by the dynamic multi-device authentication computing platform 110 based on known data elements (e.g., by randomly selecting authentication values from the cross reference which may then be used to generate starting points and hop counts). Additionally or alternatively, a hop sequence (e.g., starting points and hop counts) may be executed to capture the values used for the first authentication code. Accordingly, the authentication code may be generated and the reference key leading to that authentication code (e.g., hop count, starting points) may be stored. The reference key may be transmitted to a device requesting authentication upon receiving a request. The requesting device may then execute the hop sequence by executing one or more hop counts from designated starting points in the reference key to generate a comparison authentication code.

At step 237, the generated first authentication code may be converted to a hash value and stored. The first authentication code may be stored until a request for authentication is received and then may be used to authenticate the user and/or device. After authentication the first authentication code may be deleted and a subsequent code may be generated and stored.

For instance, at step 238, a request for authentication may be received from one or more remote user computing device. For instance, in the example shown, a request for authentication may be received from remote user computing device 175. However, the request may be received from remote user computing device 170, remote user computing device 170, or any other computing device within the key network.

Responsive to receiving the request for authentication, the remote user computing device 175 may generate a request for the first public key and the generated reference key at step 239. For instance, the stored first public key and the generated reference key including the generated hop counts may be requested for use in authentication.

At step 240, a connection may be established between the dynamic multi-device authentication computing platform 110 and remote user computing device 175. For instance, a fourth wireless connection may be established between the remote user computing device 175 and the dynamic multi-device authentication computing platform 110. Upon establishing the fourth wireless connection, a communication session may be initiated between the remote user computing device 175 and the dynamic multi-device authentication computing platform 110.

At step 241, the request for the first public key and generated reference key may be transmitted from the remote user computing device 175 to the dynamic multi-device authentication computing platform 110. For instance, the request for the first public key and generated reference key may be transmitted during the communication session initiated upon establishing the fourth wireless connection.

Figure 2H:
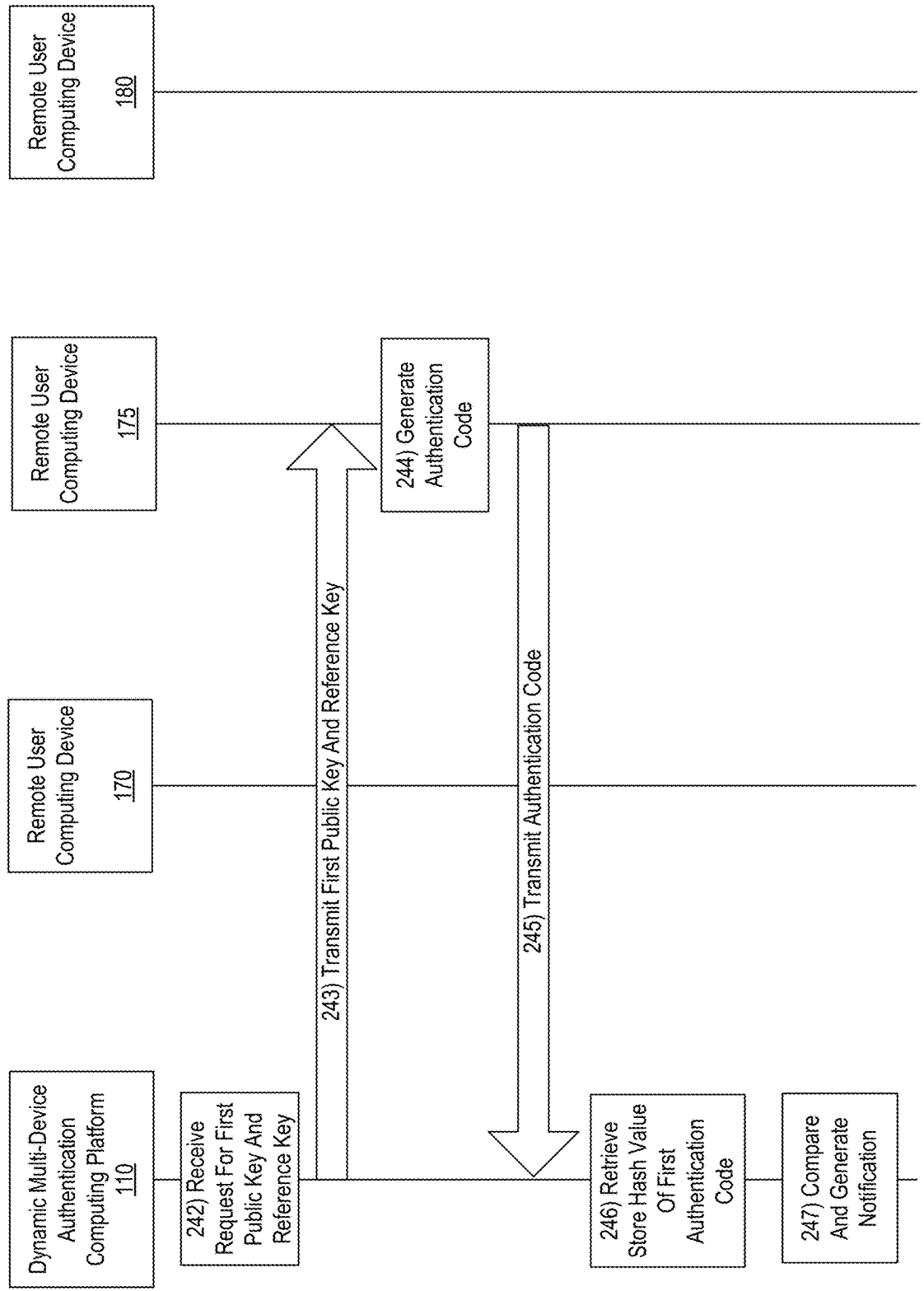

With reference to FIG. 2H, at step 242, the request for the first public key and reference key may be received and executed. At step 243, the first public key and reference key may be transmitted from the dynamic multi-device authentication computing platform 110 to the remote user computing device 175.

At step 244, the reference key and first public key may be received by the remote user computing device 175 and used to generate a comparison authentication code. For instance, the first public key may be matched to the first private key to confirm they are two keys from the generated pair. Further, the reference key may be used to execute the hop sequence including executing generated hop counts from designated starting points in order to capture the particular cell values from the matrix that correspond to the authentication code. The comparison authentication code may then be generated by executing the hop sequence and capturing corresponding values. In some examples, a hash value of the comparison authentication code may be generated and, at step 245, the comparison authentication code may be transmitted to the dynamic multi-device authentication computing platform 110 for authentication.

At step 246, the comparison authentication code may be received and the stored first authentication code may be retrieved. At step 247, the comparison authentication code received from remote user computing device 175 may be compared to the retrieved first authentication code to determine whether a match exists. Based on the comparison, a notification (e.g., approval or denial of the authentication request) may be generated.

With reference to FIG. 2I, at step 248, a connection may be established between the dynamic multi-device authentication computing platform 110 and remote user computing device 170. For instance, a fifth wireless connection may be established between the remote user computing device 170 and the dynamic multi-device authentication computing platform 110. Upon establishing the fifth wireless connection, a communication session may be initiated between the remote user computing device 170 and the dynamic multi-device authentication computing platform 110.

At step 249, a connection may be established between the dynamic multi-device authentication computing platform 110 and remote user computing device 180. For instance, a sixth wireless connection may be established between the remote user computing device 180 and the dynamic multi-device authentication computing platform 110. Upon establishing the sixth wireless connection, a communication session may be initiated between the remote user computing device 180 and the dynamic multi-device authentication computing platform 110.

At step 250, the generated notification (e.g., including authentication of the device, application, or the like, if appropriate, or denial of authentication) may be transmitted to all devices in the key network. For instance, the generated notification may be transmitted to remote user computing device 170, remote user computing device 175, and remote user computing device 180. In some examples, the notification may include a signal authenticating a device, application or the like, an enabling functionality of the device, application or the like, based on the authentication. In some examples, transmission of the notification (e.g., authenticating the user/devices or denying requested authentication) may cause one or more of the generated reference key, first encryption key pair, and the like, to be deleted. Accordingly, the generated keys, reference keys, and the like, may be for single use to authentication to a plurality of devices and then may be deleted to increase security and avoid unauthorized access.

After authenticating the device or denying the request and, subsequently deleting the generated keys, the process may repeat. Accordingly, at step 251, a second encryption key pair may be generated. Similar to the arrangement discussed above, a second encryption key pair including a second public key and second private key may be generated. In some examples, both keys may be required in order to authenticate a user to one or more devices.

At step 252, the public key of the second encryption key pair (e.g., second public key) may be stored by the dynamic multi-device authentication computing platform 110. At step 253, the private key of the second encryption key pair (e.g., second private key) may be transmitted to each computing device of the plurality of computing devices in the key network. For example, the second private key may be transmitted to each computing device for which registration information or data was received (e.g., remote user computing device 170, remote user computing device 175, remote user computing device 180, and the like).

Figure 2J:
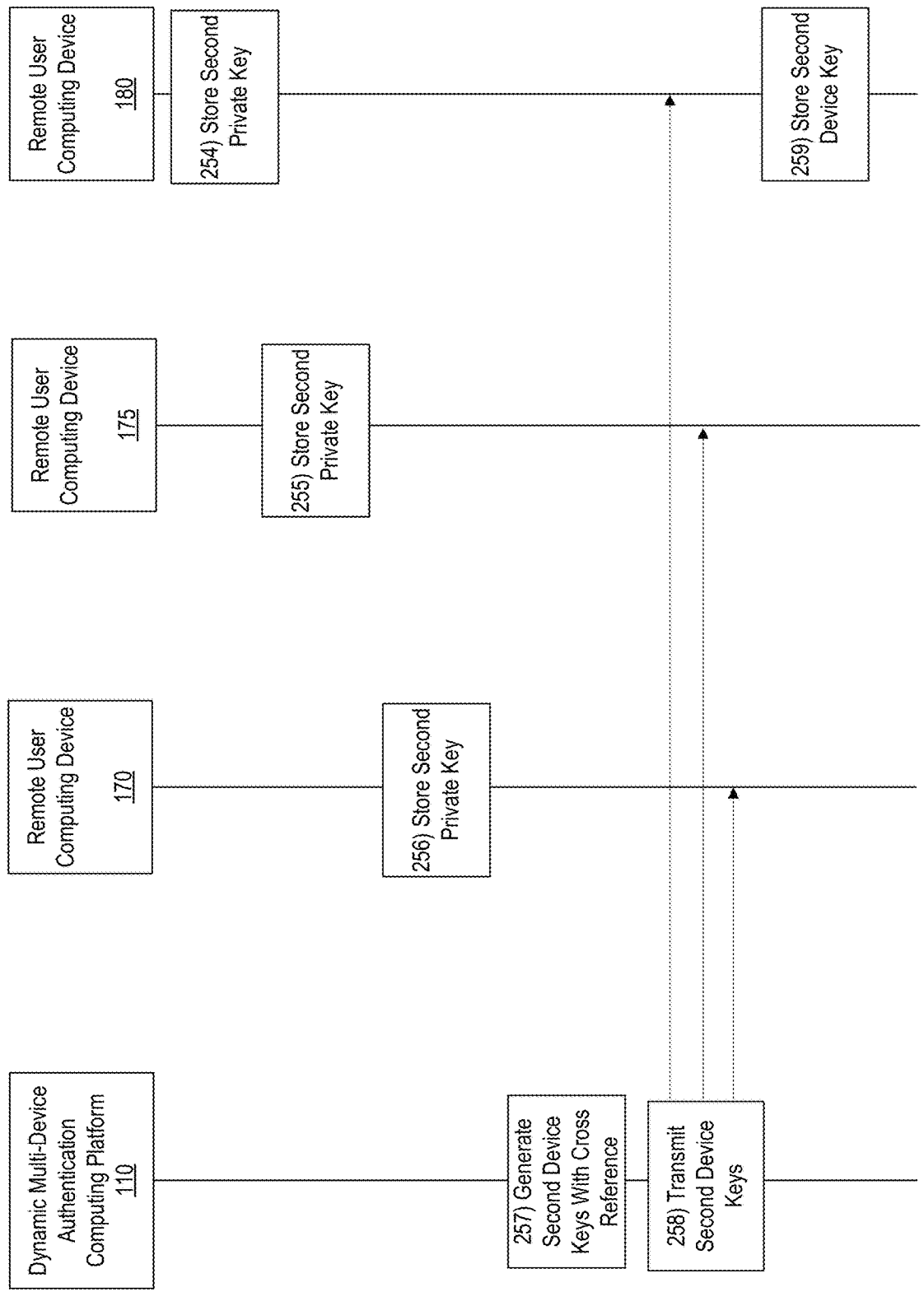

With reference to FIG. 2J, at step 254, the second private key may be received by the remote user computing device 180 and stored. At step 255, the second private key may be received by the remote user computing device 175 and stored. At step 256, the second private key may be received by the remote user computing device 170 and stored.

At step 257, second device keys with cross reference may be generated. For instance, a matrix including device data and having a plurality of cells or data elements associated with each device may be generated. In some examples, each element may include an authentication value and a forward reference value identifying a device and associated cell. As is discussed more fully herein, the values may be captured upon executing a particular hop count and may be used to authenticate the plurality of devices. In some examples, the second device keys may be different from the generated first device keys.

At step 258, the second device keys may be transmitted to each computing device within the key network. For instance, the second device keys may be transmitted from the dynamic multi-device authentication computing platform 110 to each of remote user computing device 170, remote user computing device 175, and remote user computing device 180.

At step 259, the second device key may be received by remote user computing device 180 and stored.

Figure 2K:
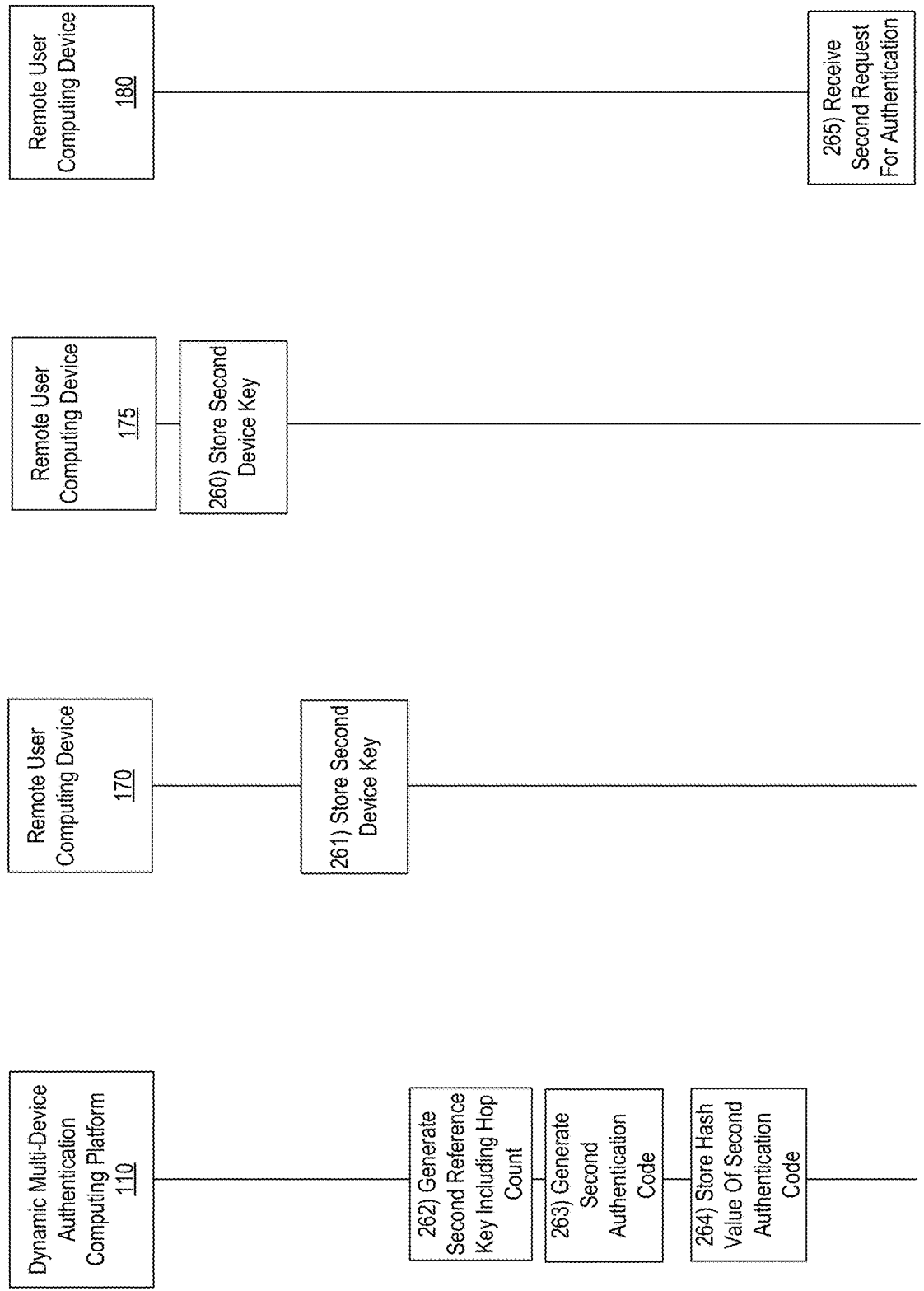

With reference to FIG. 2K, at step 260, the second device key may be received by remote user computing device 175 and stored. At step 261, the second device key may be received by remote user computing device 170 and stored.

At step 262, a second reference key including a generated hop count and starting points may be generated. Similar to the arrangements discussed above, the hop count may include a number of forward references to complete before capturing a value from a particular cell. In some examples, a hop sequence may be executed to generate an authentication code (e.g., based on values in a plurality of cells associated with the plurality of devices). In some examples, the second reference key may be different (e.g., include different hop counts, different starting points, or the like) from the first reference key.

At step 263, a second authentication code may be generated. The second authentication may be generated similarly to the first authentication code (e.g., by executing the generated hop counts to capture corresponding values or from known data elements (e.g., random selection of authentication values)).

At step 264, the generated second authentication code may be converted to a hash value and stored. The second authentication code may be stored until a request for authentication is received and then may be used to authenticate the user and/or device. After authentication the second authentication code may be deleted and a subsequent code may be generated and stored.

Accordingly, the generated keys, authentication code, and the like, may be stored until a subsequent request for authentication is received. Accordingly, at step 265, a subsequent authentication request may be received. Similar to the arrangements above, the request may be received from any of the remote user computing devices within the key network. For example, the request may be received from remote user computing device 180. The process of authentication may then repeat similar to the arrangements discussed herein.

Figure 3:
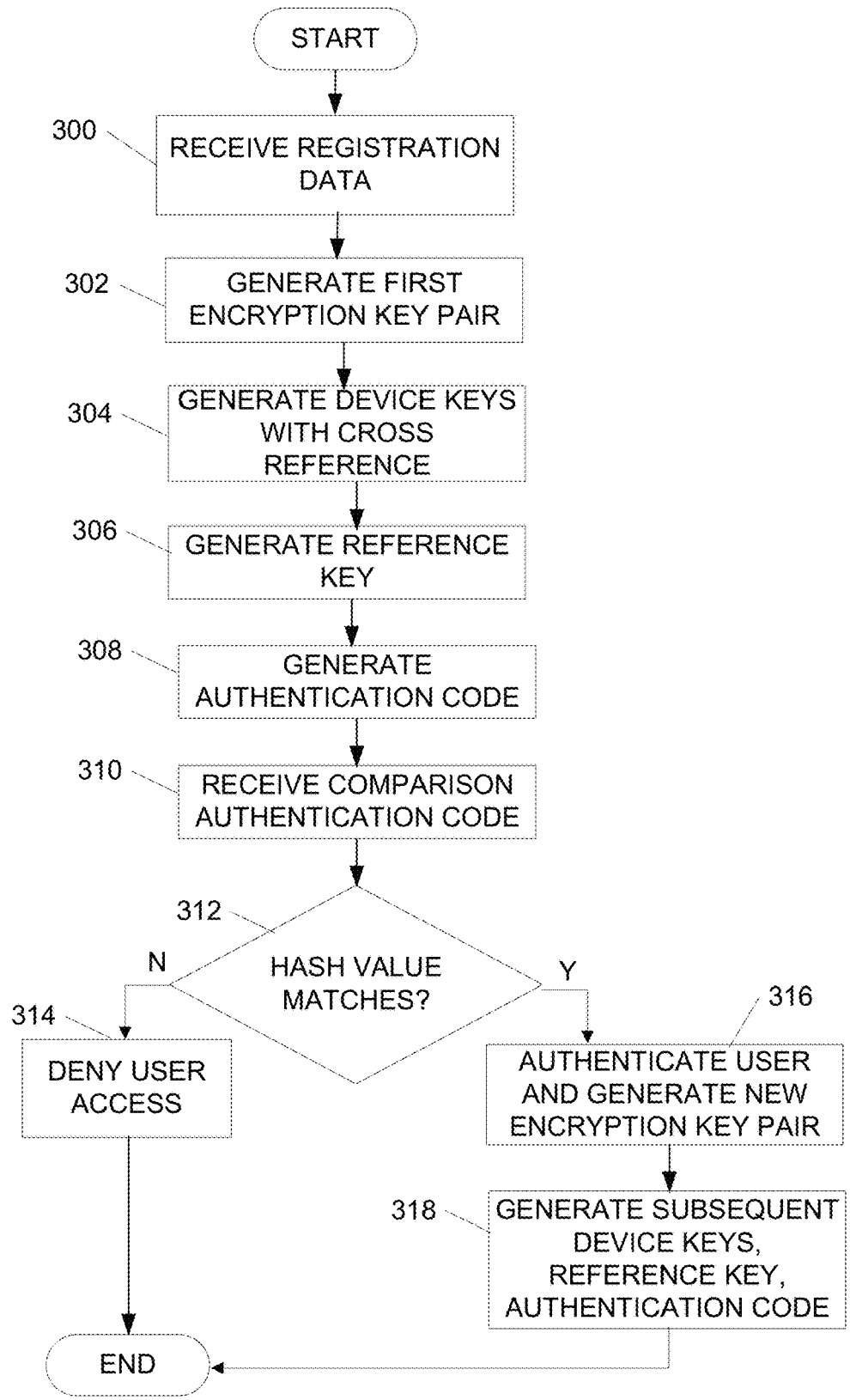
FIG. 3 depicts an illustrative method for implementing and using dynamic multi-device authentication according to one or more aspects described herein.

FIG. 3 is a flow chart illustrating one example method of dynamic, multi-device authentication according to one or more aspects described herein. The processes illustrated in FIG. 3 are merely some example processes and functions. The steps shown may be performed in the order shown, in a different order, more steps may be added, or one or more steps may be omitted, without departing from the invention.

At step 300, registration information may be received. For instance, device attributes may be identified (e.g., by an application executing on the device) and may be transmitted to the dynamic multi-device authentication computing platform 110 and stored by the multi-device authentication computing platform 110. In some examples, device attributes of a plurality of devices within a key network may be received, as discussed herein. In some examples, device attributes may include a unique identifier of the device, an international mobile equipment identity (IMEI), application identification information, and the like.

At step 302, a first encryption key pair may be generated. In some examples, the first encryption key pair may include a public key stored by the dynamic multi-device authentication computing platform 110 and a private key transmitted to the device(s) within the key network (e.g., remote user computing device 170, remote user computing device 175, remote user computing device 180, or the like) and stored by the respective device.

At step 304, device keys including cross reference information may be generated and transmitted to the device(s) in the key network (e.g., remote user computing device 170, remote user computing device 175, remote user computing device 180, or the like) and stored for use in an authentication process. The device keys including cross reference information may include a matrix including a plurality of devices each having a plurality of cells or data elements associated therewith. An authentication value (e.g., value forming a portion of an authentication code) for each element of each device may be included in the matrix, as well as a forward reference value that may be used in conjunction with a generated hop count and starting points to capture appropriate values corresponding to the authentication code.

At step 306, a reference key may be generated and stored by the dynamic multi-device authentication computing platform 110. The reference key may include a dynamically generated hop count that may be executed to capture values from the generated matrix that may comprise an authentication code. The reference key may further include a starting point or cell (e.g., point zero in the sequence to be executed).

At step 308, an authentication code may be generated. For instance, the dynamic multi-device authentication computing platform 110 may generate a first authentication code. The authentication code may include a string of values (e.g., alphanumeric values) in a particular order and may be stored for comparison with a comparison authentication code generated by a requesting computing device and based on the reference key and cross reference matrix stored by the computing device. The authentication code may be converted to a hash value and stored by the dynamic multi-device authentication computing platform 110.

At step 310, a request for authentication may be received. The request for authentication may initiate an authentication process which may cause the device (e.g., remote user computing device 170, remote computing device 175, remote computing device 180, or the like) to generate a comparison authentication code based on the stored device keys including cross reference information, generated hop count, and the like. For instance, the requesting computing device may receive the reference key including the generated hop count, as well as the public encryption key. The requesting device may then execute the hop count to capture a sequence of values from the matrix stored by the requesting device. The sequence of values may comprise a comparison authentication code and may be converted to a hash value and transmitted to the dynamic multi-device authentication computing platform 110. The generated comparison authentication code may be received by the dynamic multi-device authentication computing platform 110 at step 310 and the stored hash value of the authentication code may be retrieved. The stored hash value may be compared to the received hash value of the generated comparison authentication code to determine whether a match exists in step 312.

If a match does not exist at step 312, the authentication request may be denied at step 314. Accordingly, a notification may be generated and transmitted to one or more devices in the key network indicating that the requested authentication has been denied.

If, at step 312, the values do match, the user may be authenticated at step 316 and an instruction, signal or command authenticating the user and/or devices in the key network may be transmitted to one or more devices in the key network (e.g., remote user computing device 170, remote user computing device 175, remote user computing device 180, and the like). In some examples, after a determination has been made at step 312 (e.g., either authenticate or deny), one or more of the generated reference key, encryption keys, cross reference, and the like, may be deleted by the dynamic multi-device authentication computing platform 110, as well as one or more devices in the key network (e.g., remote user computing device 170, remote user computing device 175, remote user computing device 180, or the like). Thus, although a single process may be used to authenticate to multiple devices, the keys, reference, and the like, may be used a single time and then deleted to further protect privacy and prevent unauthorized access.

Accordingly, at step 318, a subsequent encryption key pair, reference key, device key(s) with cross reference, and the like may be generated, similar to other arrangements described herein. The generated items may be stored by their respective devices as described herein until a subsequent request for authentication is received.

FIG. 4 illustrates one example cross reference key that may be generated by the dynamic multi-device authentication computing platform 110. As discussed herein, the cross reference key may be generated, transmitted to one or more devices (e.g., one or more devices in a key network) and stored by the one or more devices. In some examples, the cross reference key may be transmitted to all devices in the key network and stored by all devices.

The example key network associated with the cross reference key shown in FIG. 4 includes four (4) devices. For instance, the key network of this example may include four (4) computing devices associated with a user or entity. The devices may be a same type of device (e.g., four different smart phones) or may be different types of devices (e.g., a combination of smart phones, tablets, laptops, wearable devices, and the like). In at least some arrangements described herein, the devices may be part of a key network such that authentication to one device may authenticate to all devices in the key network (e.g., via a single process without authenticating to each individual device).

In some arrangements, cross reference data for each device may be generated. Cross reference data 402, 404, 406, and 408 each correspond to a different device in the key network. In some examples, each cross reference data 402, 404, 406, and 408 may be transmitted to each device in the key network. In other examples, cross reference data may be transmitted to a respective device. For instance, cross reference data 402 may be transmitted to Device 1, while cross referenced data 404 may be transmitted to Device 2, while cross reference data 406 may be transmitted to Device 3, while cross reference data 408 may be transmitted to Device 4. In these examples, the devices (e.g., two or more devices, all devices, or the like) may communicate with each other to execute hop sequences, capture authentication values, and the like.

Each device includes a plurality of data elements or cells. For instance, the example shown includes five (5) data elements or cells for each device: cell 0, cell 1, cell 2, cell 3, and cell 4. More or fewer data elements or cells may be used without departing from the invention.

Each data element or cell may correspond to a value (e.g., an authentication value that may be used in a string of values to authenticate one or more devices), as well as a forward reference value to another device and data element or cell. As discussed herein, the cross reference key may be stored by one or more computing devices in the key network (e.g., devices (such as remote user computing devices) that may request authentication from the dynamic multi-device authentication computing platform 110). Accordingly, upon requesting authentication, the computing device may request a reference key from the dynamic multi-device computing platform 110. The reference key may include one or more data elements or cells at which to begin execution of a sequence to obtain a value for use in the authentication code, as well as a number for forward references or "hops" to make before capturing a value. One example reference key is shown in FIG. 5.

As shown in FIG. 5, one column includes a starting point for the execution of the sequence, while a second column includes a number of forward references or hops to make before capturing a value for the generating the comparison authentication code. As discussed herein, the number of hops for each item may be randomly generated and may be dynamically generated for each authentication attempt (e.g., the reference key may be deleted after use and a new reference key with new hop counts may be generated). Additionally or alternatively, the starting points may also be randomly generated and dynamically generated for each authentication attempt (e.g., the reference key may be deleted after use and a new reference key with starting points may be generated).

FIGS. 6A-6F illustrate one example execution of a hop sequence to generate a comparison authentication code. The example of FIGS. 6A-6F executes the starting points and hop counts shown in FIG. 5 and relies on the cross reference key shown in FIG. 4 for authentication values and forward reference points. Accordingly, this is merely one example of generation of an authentication code and should not be viewed as limiting the arrangements described herein to a particular number of hop counts, starting points, authentication values, or the like.

Figure 6A:
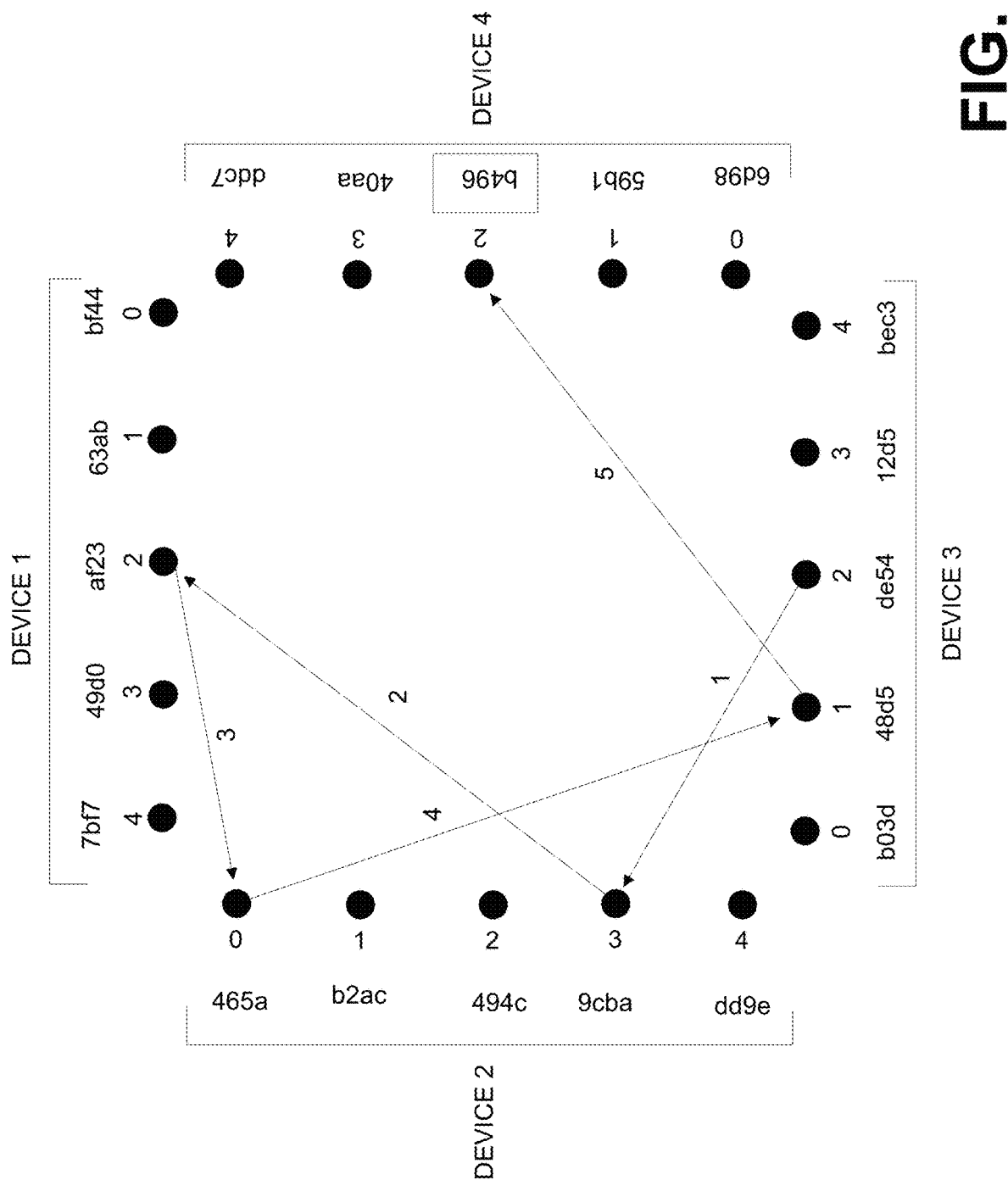
FIGS. 6A-6F illustrate example hop sequences for obtaining an authentication value to generate a comparison authentication code according to one or more aspects described herein.

In FIG. 6A, the count begins at Device 3 and Cell 2, as indicated in the first row in FIG. 5. Five hops or forward advancements between designated cells are then executed. Accordingly, based on the cross reference key of FIG. 4, the hop count may be executed to go from Device 3, Cell 2 (starting point) to Device 2, Cell 3 (hop 1—based on forward reference in FIG. 4) to Device 1, Cell 2 (hop 2) to Device 2, Cell 0 (hop 3) to Device 3, Cell 1 (hop 4) to Device 4, Cell 2 (hop 5). The value of Device 4, Cell 2 (b496) is then captured and may be the first authentication value in a string of authentication values that may make up the comparison authentication code generated by the requesting device.

Figure 6B:
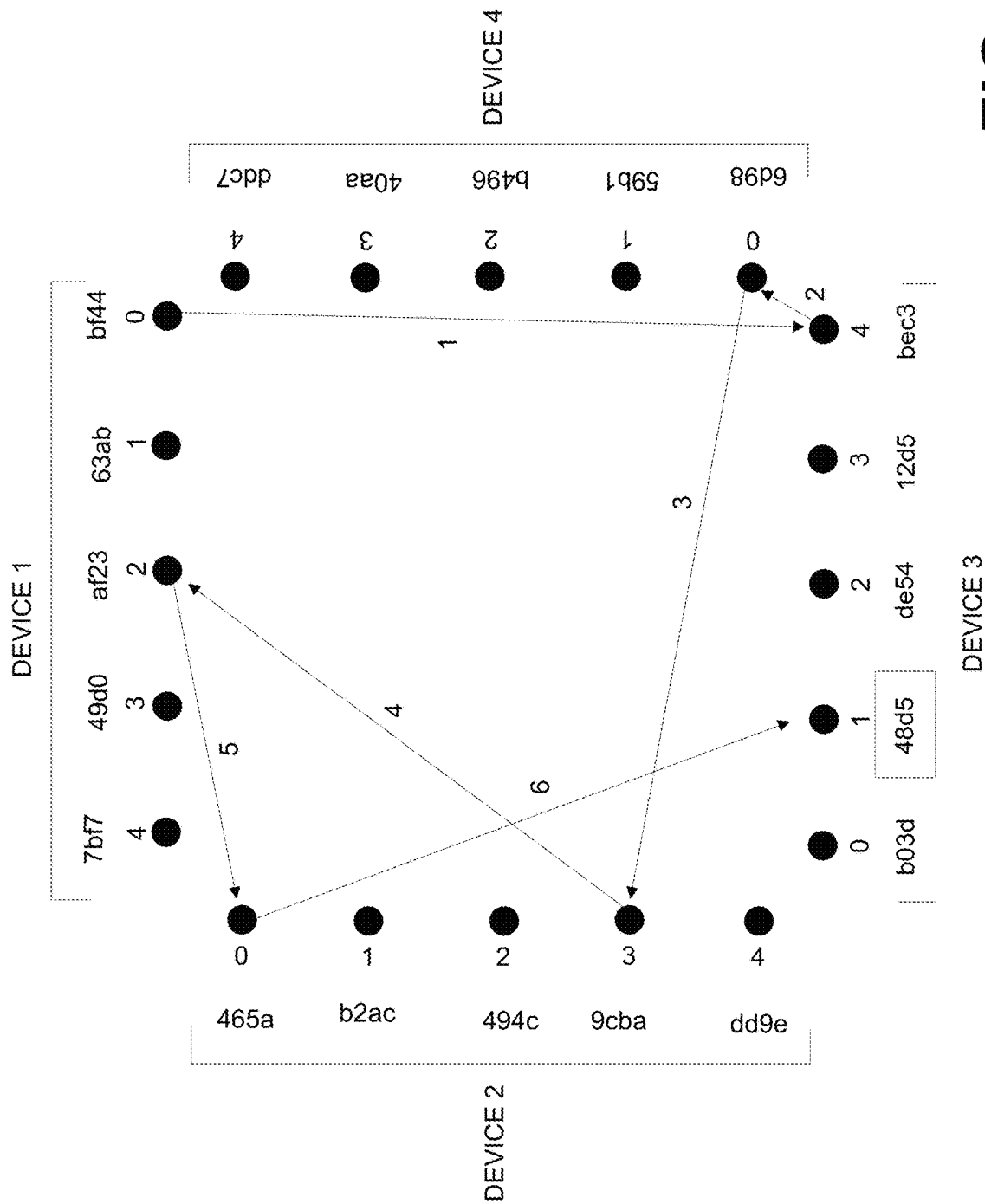

In FIG. 6B, the count begins at Device 1 and Cell 0, as indicated in the second row in FIG. 5. Six hops or forward advancements between designated cells are then executed. Accordingly, based on the cross reference key of FIG. 4, the hop count may be executed to go from Device 1, Cell 0 (starting point) to Device 3, Cell 4 (hop 1) to Device 4, Cell 0 (hop 2) to Device 2, Cell 3 (hop 3) to Device 1, Cell 2 (hop 4) to Device 2, Cell 0 (hop 5) to Device 3, Cell 1 (hop 6). The value of Device 3, Cell 1 (48d5) is then captured and may be the second authentication value in the string of authentication values that may make up the comparison authentication code generated by the requesting device.

Figure 6C:
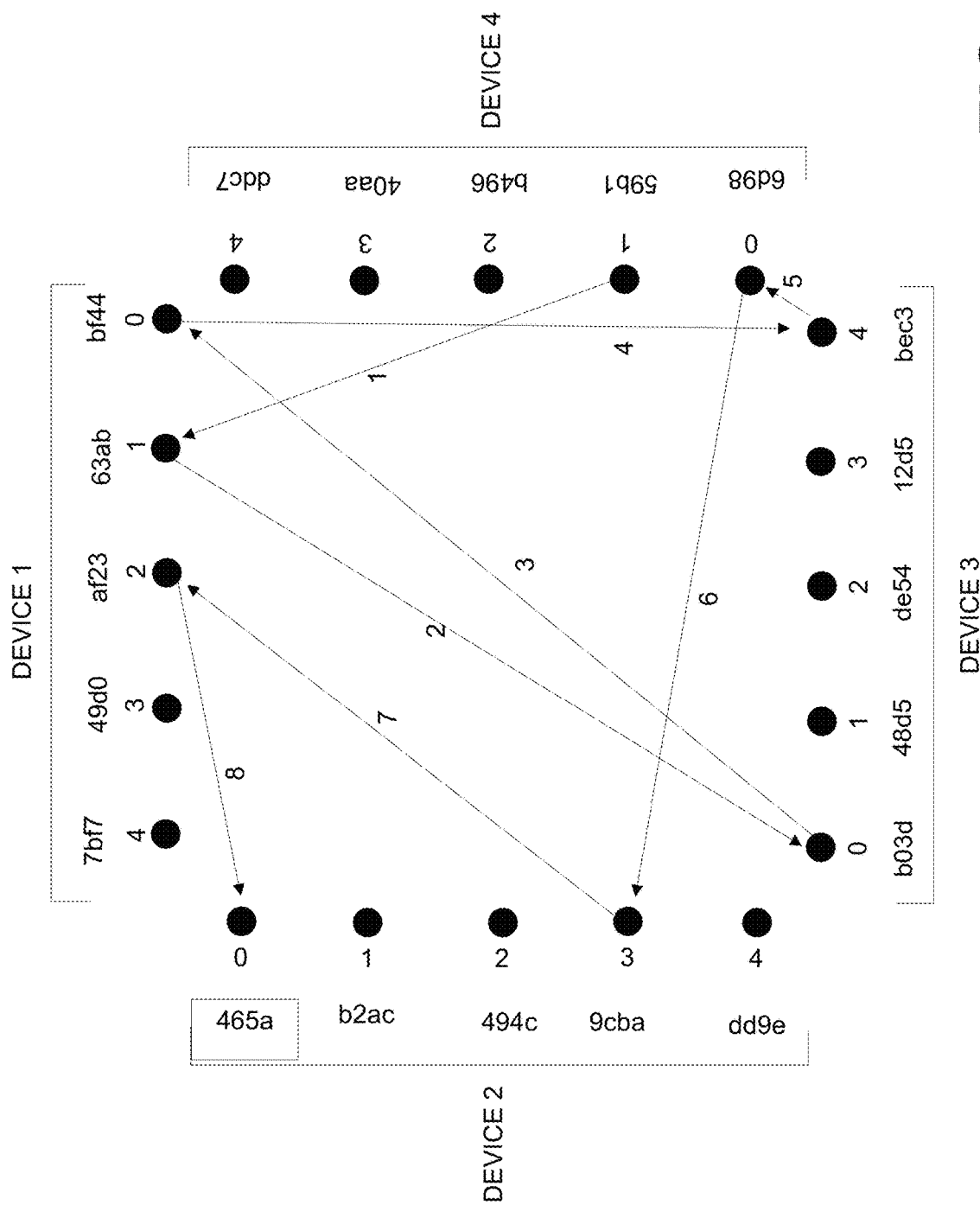

In FIG. 6C, the count begins at Device 4 and Cell 1, as indicated in the third row in FIG. 5. Eight hops or forward advancements between designated cells are then executed. Accordingly, based on the cross reference key of FIG. 4, the hop count may be executed to go from Device 4, Cell 1 (starting point) to Device 1, Cell 1 (hop 1) to Device 3, Cell 0 (hop 2) to Device 1, Cell 0 (hop 3) to Device 3, Cell 4 (hop 4) to Device 4, Cell 0 (hop 5) to Device 2, Cell 3 (hop 6) to Device 1, Cell 2 (hop 7) to Device 2, Cell 0 (hop 8). The value of Device 2, Cell 0 (465a) is then captured and may be the third authentication value in the string of authentication values that may make up the comparison authentication code generated by the requesting device.

Figure 6D:
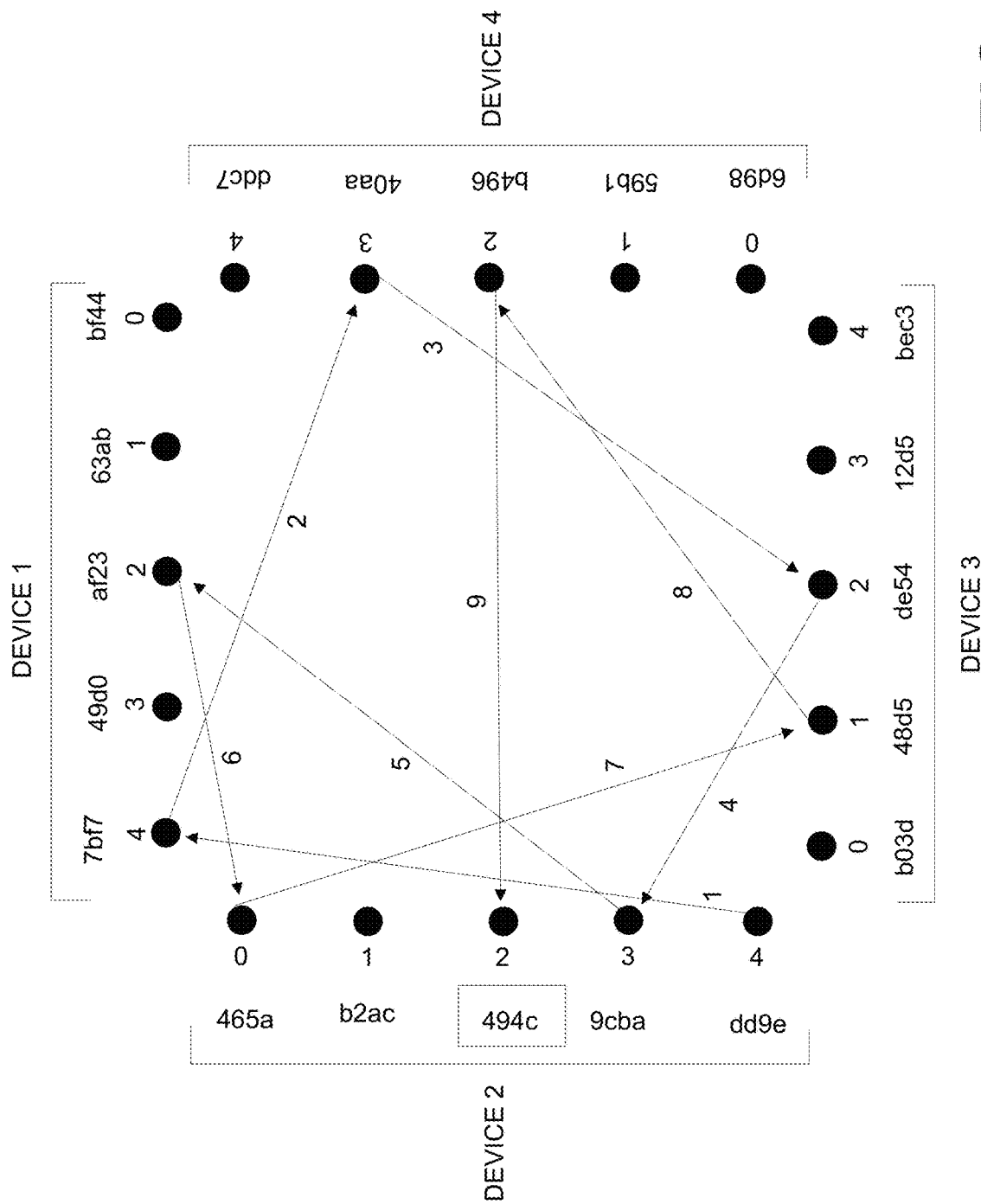

In FIG. 6D, the count begins at Device 2 and Cell 4, as indicated in the fourth row in FIG. 5. Nine hops or forward advancements between designated cells are then executed. Accordingly, based on the cross reference key of FIG. 4, the hop count may be executed to go from Device 2, Cell 4 (starting point) to Device 1, Cell 4 (hop 1) to Device 4, Cell 3 (hop 2) to Device 3, Cell 2 (hop 3) to Device 2, Cell 3 (hop 4) to Device 1, Cell 2 (Hop 5) to Device 2, Cell 0 (hop 6) to Device 3, Cell 1 (hop 7) to Device 4, Cell 2 (hop 8) to Device 2, Cell 2 (hop 9). The value of Device 2, Cell 2 (494c) is then captured and may be the fourth authentication value in the string of authentication values that may make up the comparison authentication code generated by the requesting device.

Figure 6E:
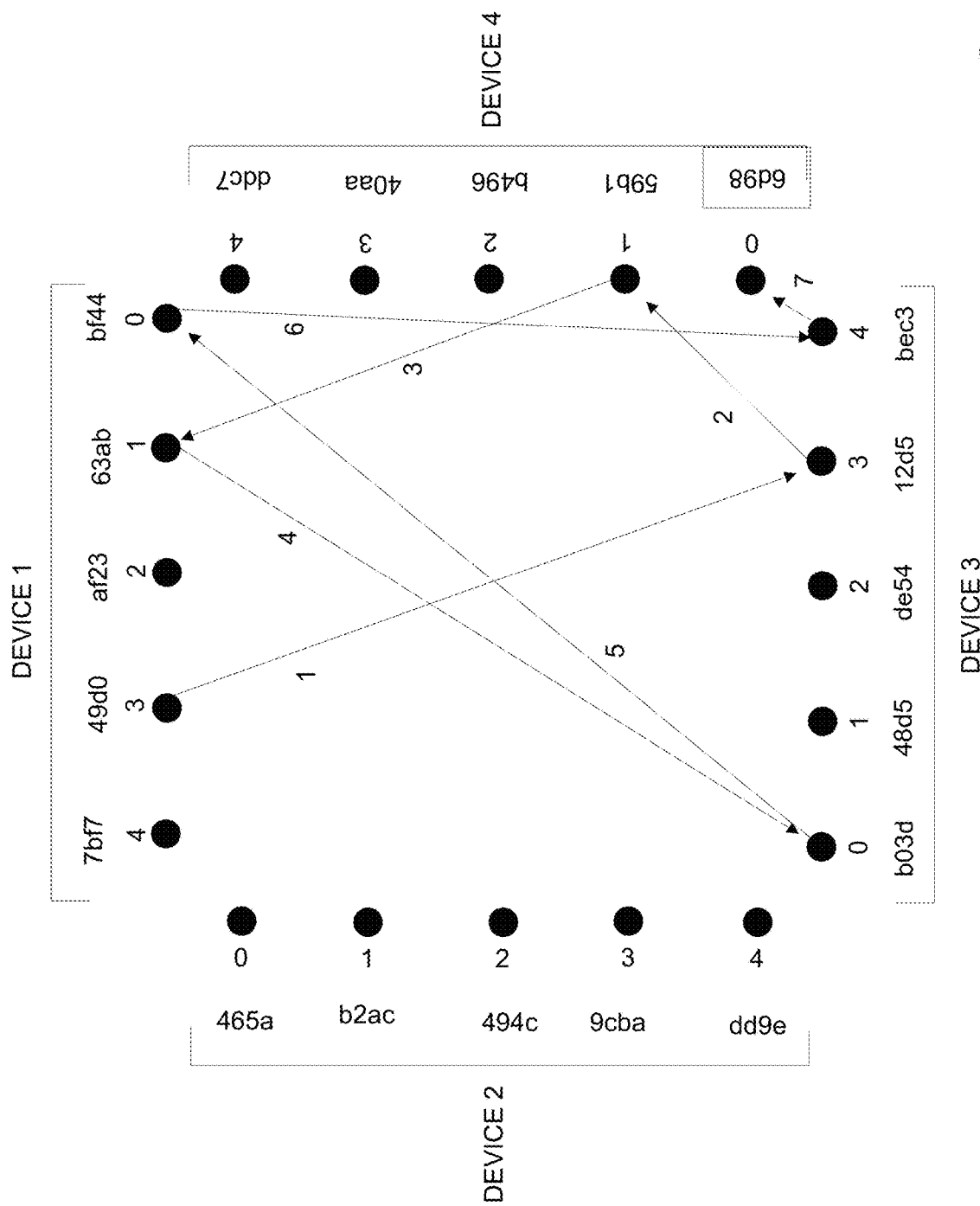

In FIG. 6E, the count begins at Device 1 and Cell 3, as indicated in the fifth row in FIG. 5. Seven hops or forward advancements between designated cells are then executed. Accordingly, based on the cross reference key of FIG. 4, the hop count may be executed to go from Device 1, Cell 3 (starting point) to Device 3, Cell 3 (hop 1) to Device 4, Cell 1 (hop 2) to Device 1, Cell 1 (hop 3) to Device 3, Cell 0 (hop 4) to Device 1, Cell 0 (hop 5) to Device 3, Cell 4 (hop 6) to Device 4, Cell 0 (hop 7). The value of Device 4, Cell 0 (6d98) is then captured and may be the fifth authentication value in the string of authentication values that may make up the comparison authentication code generated by the requesting device.

Figure 6F:
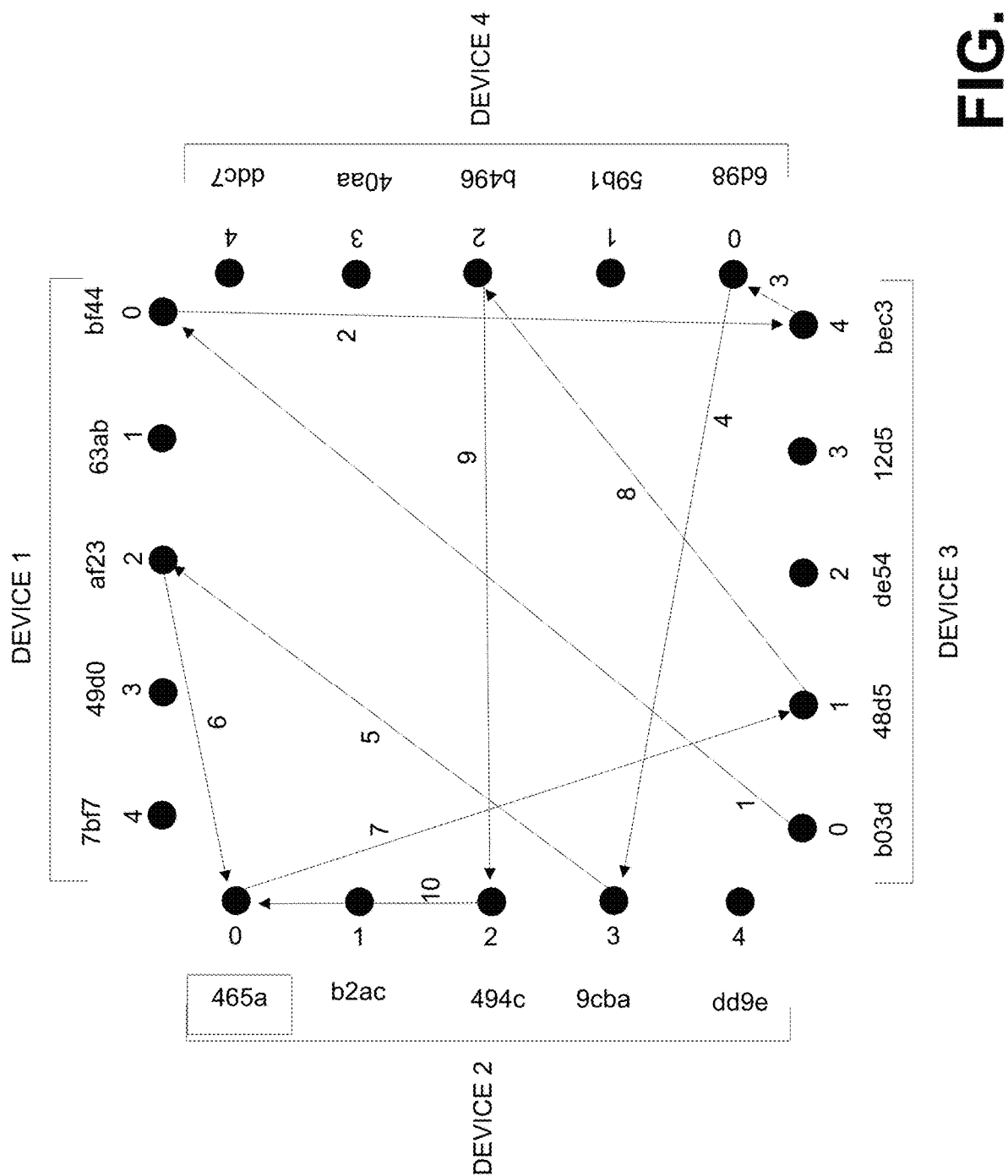

In FIG. 6F, the count begins at Device 3 and Cell 0, as indicated in the sixth row in FIG. 5. Ten hops or forward advancements between designated cells are then executed. Accordingly, based on the cross reference key of FIG. 4, the hop count may be executed to go from Device 3, Cell 0 (starting point) to Device 1, Cell 0 (hop 1) to Device 3, Cell 4 (hop 2) to Device 4, Cell 0 (hop 3) to Device 2, Cell 3 (hop 4) to Device 1, Cell 2 (hop 5) to Device 2, Cell 0 (hop 6) to Device 3, Cell 1 (hop 7) to Device 4, Cell 2 (hop 8) to Device 2, Cell 2 (hop 9) to Device 2, Cell 0 (hop 10). The value of Device 2, Cell 0 (465a) is then captured and may be the sixth authentication value in the string of authentication values that may make up the comparison authentication code generated by the requesting device.

Each captured value may then be used in sequence to generate a comparison authentication code. Accordingly, the comparison authentication code generated by the requesting device in this example may be b496+48d5+465a+494c+6d98+465a. This comparison authentication code may be converted to a hash value, transmitted to the dynamic multi-device authentication computing platform 110 and compared to the hash value of the stored authentication code. If the codes match, the requested authentication for devices (in some examples, all devices) in the key network may be approved. If the codes do not match, the requested authentication may be denied.

In some examples, the rotation counter may be equal to or greater than the number of devices in the key network. Further, in some examples, the total number of hops may be equal to or greater than the total number of unique cells.

Figure 7:
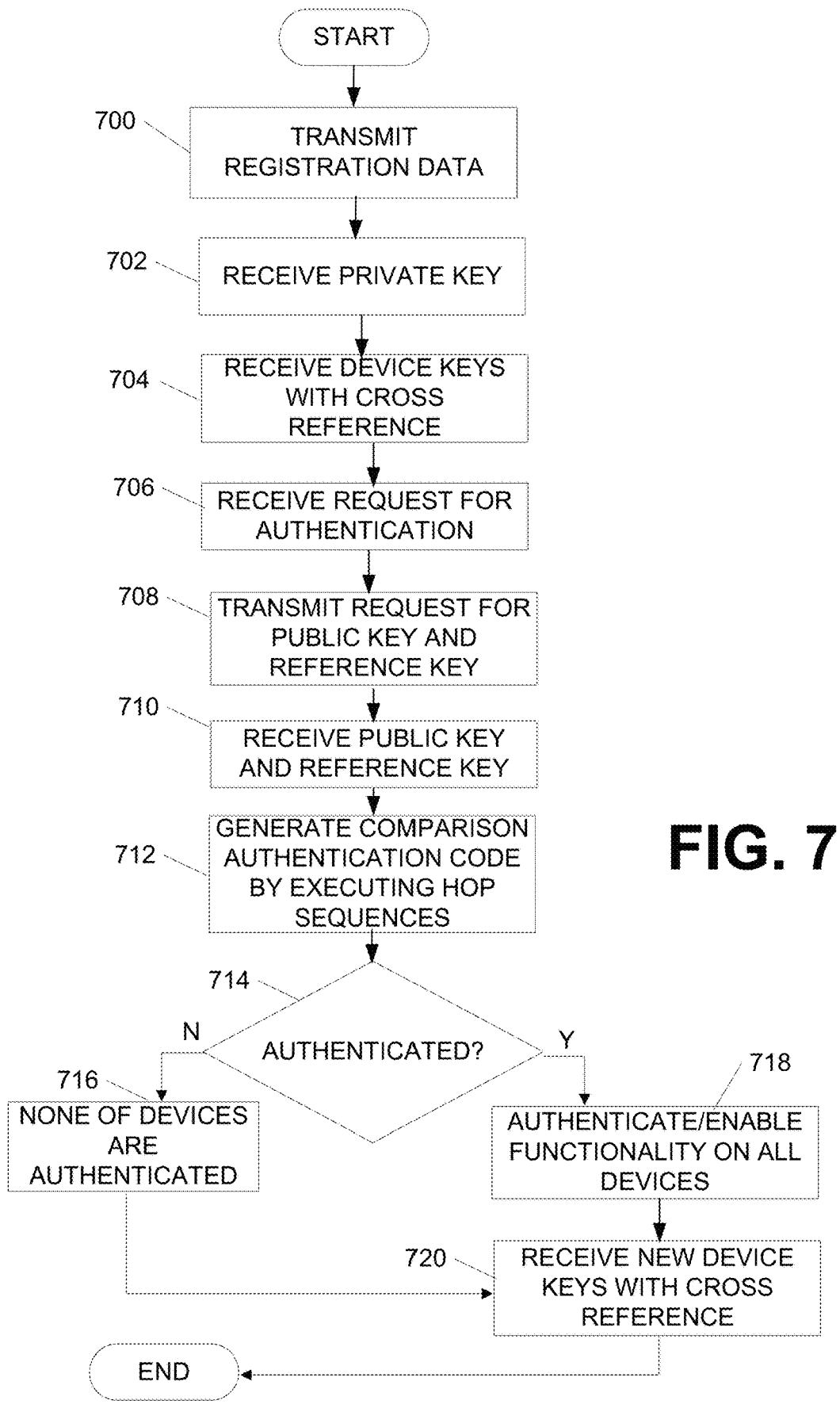
FIG. 7 depicts an illustrative method for implementing and using dynamic multi-device authentication according to one or more aspects described herein.

FIG. 7 is a flow chart illustrating one example method of dynamic, multi-device authentication according to one or more aspects described herein. The processes illustrated in FIG. 3 are merely some example processes and functions. The steps shown may be performed in the order shown, in a different order, more steps may be added, or one or more steps may be omitted, without departing from the invention.

At step 700, registration information may be transmitted to, for instance, a dynamic multi-device authentication computing platform 110. For instance, device attributes may be identified (e.g., by an application executing on the device) and may be transmitted to the dynamic multi-device authentication computing platform 110 and stored by the multi-device authentication computing platform 110. In some examples, device attributes of a plurality of devices within a key network may be received, as discussed herein. In some examples, device attributes may include a unique identifier of the device, an international mobile equipment identity (IMEI), application identification information, and the like.

At step 702, a first private key of a first encryption key pair may be received and stored by the computing device. In some examples, one or more of the processes described with respect to FIG. 7 may be performed by one or more devices in the key network. In some arrangements, one or more of the processes described with respect to FIG. 7 may be performed by all devices in the key network. Accordingly, in at least some examples, the first private key may be received by one or more computing device in the key network.

At step 704, device keys with cross reference data may be received. For instance, as described herein, the device keys including cross reference information may include a matrix including a plurality of devices each having a plurality of cells or data elements associated therewith. An authentication value (e.g., value forming a portion of an authentication code) for each element of each device may be included in the matrix, as well as a forward reference value that may be used in conjunction with a generated hop count and starting points to capture appropriate values corresponding to the authentication code. In at least some examples, the device keys with cross reference data may be received by one or more, or, in some examples, all devices in the key network. In some arrangements, the device keys with cross reference data received by each device may be different (e.g., the corresponding device and cell data may be received by the respective device) while in other arrangements, cross reference data for all devices may be received by each device.

At step 706, a request for authentication may be received. In some examples, the request for authentication may be received by one or more devices in the key network and may include a request to authenticate one or more devices in the key network to a system, one or more applications executing on one or more devices of the key network, or the like.

At step 708, in response to receiving the request for authentication, a request for a first public key of the first encryption key pair and a reference key may be generated and transmitted to the dynamic multi-device authentication computing platform. At step 710, the first public key and reference key may be received by one or more computing devices in the key network (e.g., by the requesting device, by all devices in the key network, and the like). As discussed herein, the reference key may include a dynamically generated hop count that may be executed to capture values from the generated matrix that may comprise an authentication code. The reference key may further include one or more starting points or cells (e.g., point zero in the sequence to be executed). In some examples, the reference key may include a hop count and starting point for a plurality of hop sequences that may be executed to capture authentication values used to generate a comparison authentication code.

For instance, at step 712, one or more hop sequences may be executed based on the hop counts and starting points in the reference key. For example, a first hop sequence may be executed by identifying a first cell based on the designated first starting point and executing a number of forward hops based on the hop count and directed by the forward reference value associated with each cell. Upon reaching the cell of the final hop, the authentication value may be captured and used in a string of values to generate a comparison authentication code. Additional hop sequences may then be executed based on other starting points and hop counts to capture additional authentication values. Based on the captured authentication values, the comparison authentication code may be generated. In some example, a hash value of the generated comparison authentication code may be generated.

The generated comparison authentication code and/or hash value may be transmitted to the dynamic multi-device authentication computing platform 110 and may be compared to a pre-generated, stored authentication value (e.g., hash value).

In some examples, executing the hop sequences may include identifying values using a single device (e.g., when all cross reference data for all devices is received by each device a requesting device may execute the hop sequences to identify the authentication values). Additionally or alternatively, executing the hop sequences may including identifying values using a plurality of devise in the key network and, in some cases, using all devices in the key network. For instance, if cross reference data for each device is provided to the respective device and not to all devices, the devices may then communicate and transmit values identify (e.g., authentication values, forward reference values, and the like) by transmitting and receiving data from the plurality of devices.

At step 714, a notification or instructions may be received by the computing device(s) indicating whether the comparison authentication code matches the stored authentication code and the device(s) are authenticated or the codes do not match and the requested authentication is denied. If, at step 714, the request for authentication is denied, at step 716, none of the devices in the key network may be authenticated, the stored reference key, cross reference data, and/or comparison authentication code may be deleted and, at step 720, new device keys with cross reference data may be received.

If, at step 714, the device is authenticated, an instruction, command or signal may be received authenticating, in at least some examples, all devices in the key network and enabling associated functionality at step 718 and the current cross reference data, reference key, comparison authentication code, or the like, may be deleted. At step 720, a second or subsequent device key with cross reference data may be received and stored by one or more devices of the plurality of devices in the key network.

Aspects discussed herein are related to authentication on a plurality of devices. For instance, a user may have a plurality of computing devices. The arrangements described herein provide for authentication on all devices (e.g., all devices within a key network) via a single process. For example, if an application is being used on multiple devices and requires authentication to, for instance, execute on a device, the application may be authenticated to all devices via a single process, rather than requiring authentication of the application on each device separately. In other examples, the arrangements described herein may be used to authenticate one or more devices to a system, a user to a plurality of devices, or the like.

Further, aspects described herein are directed to arrangements which increase the speed of an authentication process. For instance, by reducing the amount of data stored on the computing platform or server side, and by reducing an amount of data being transmitted between the remote user computing devices of the key network and the computing platform, the time required for authentication may be reduced.

In addition, because all devices may be authenticated in a single process, the authentication process is streamlined and the time to authenticate may be reduced.

Further, the arrangements described herein reduce the susceptibility of the system to unauthorized access by not storing all data necessary for authentication on one device. For instance, by storing portions of the data needed for authentication on the computing platform side (e.g., reference key, and the like) and portions of the data needed for authentication on the remote computing device side (e.g., cross reference data), the likelihood of an unauthorized actor obtaining all data needed for authentication may be reduced.

Although some arrangements described herein may include a remote user computing device generating an authentication code by executing hop counts according to a received reference key and based on cross reference data, in some examples, cross reference data for each device may be stored on the respective device. Accordingly, in order to execute the hop sequence and obtain the authentication values, the devices within the key network must communicate with each other to advance from cell to cell in order to identify the authentication value and generate the comparison authentication code. These arrangements may further increase security of the system by storing the cross reference data for each device on a respective device.

Further, as discussed herein, by storing device keys including cross reference data on the computing devices, an amount of data necessary for transfer during the authentication process may be reduced, thereby conserving computing resources, improving efficiency and decreasing time for authentication. For instance, in some examples, a reference key, which may include a smaller amount of data than the cross reference data, may be transmitted during the authentication process, thereby increasing security while keeping an amount of data being transmitted during the process to a minimum. Further, only the generated comparing authentication code may be transmitted from the computing device to the computing platform for comparison, which also limits an amount of data being transmitted during the process and improves efficiency and speed.

Figure 8:
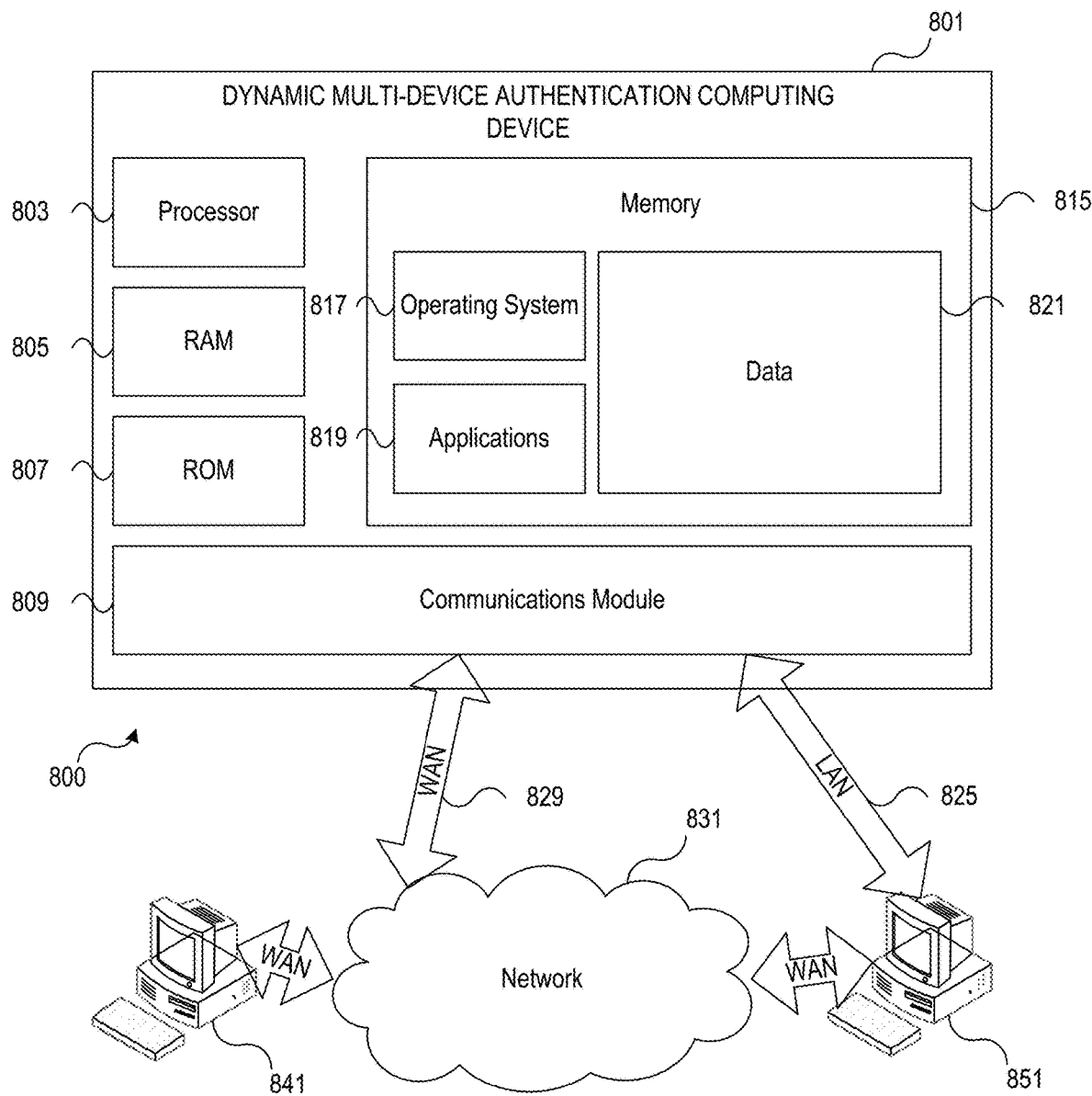
FIG. 8 illustrates one example operating environment in which various aspects of the disclosure may be implemented in accordance with one or more aspects described herein.

FIG. 8 depicts an illustrative operating environment in which various aspects of the present disclosure may be implemented in accordance with one or more example embodiments. Referring to FIG. 8, computing system environment 800 may be used according to one or more illustrative embodiments. Computing system environment 800 is only one example of a suitable computing environment and is not intended to suggest any limitation as to the scope of use or functionality contained in the disclosure. Computing system environment 800 should not be interpreted as having any dependency or requirement relating to any one or combination of components shown in illustrative computing system environment 800.

Computing system environment 800 may include dynamic multi-device authentication computing device 801 having processor 803 for controlling overall operation of dynamic multi-device authentication computing device 801 and its associated components, including Random Access Memory (RAM) 805, Read-Only Memory (ROM) 807, communications module 809, and memory 815. Dynamic multi-device authentication computing device 801 may include a variety of computer readable media. Computer readable media may be any available media that may be accessed by dynamic multi-device authentication computing device 801, may be non-transitory, and may include volatile and nonvolatile, removable and non-removable media implemented in any method or technology for storage of information such as computer-readable instructions, object code, data structures, program modules, or other data. Examples of computer readable media may include Random Access Memory (RAM), Read Only Memory (ROM), Electronically Erasable Programmable Read-Only Memory (EEPROM), flash memory or other memory technology, Compact Disk Read-Only Memory (CD-ROM), Digital Versatile Disk (DVD) or other optical disk storage, magnetic cassettes, magnetic tape, magnetic disk storage or other magnetic storage devices, or any other medium that can be used to store the desired information and that can be accessed by dynamic multi-device authentication computing device 801.

Although not required, various aspects described herein may be embodied as a method, a data transfer system, or as a computer-readable medium storing computer-executable instructions. For example, a computer-readable medium storing instructions to cause a processor to perform steps of a method in accordance with aspects of the disclosed embodiments is contemplated. For example, aspects of method steps disclosed herein may be executed on a processor on dynamic multi-device authentication computing device 801. Such a processor may execute computer-executable instructions stored on a computer-readable medium.

Software may be stored within memory 815 and/or storage to provide instructions to processor 803 for enabling dynamic multi-device authentication computing device 801 to perform various functions as discussed herein. For example, memory 815 may store software used by dynamic multi-device authentication computing device 801, such as operating system 817, application programs 819, and associated database 821. Also, some or all of the computer executable instructions for dynamic multi-device authentication computing device 801 may be embodied in hardware or firmware. Although not shown, RAM 805 may include one or more applications representing the application data stored in RAM 805 while dynamic multi-device authentication computing device 801 is on and corresponding software applications (e.g., software tasks) are running on dynamic multi-device authentication computing device 801.

Communications module 809 may include a microphone, keypad, touch screen, and/or stylus through which a user of dynamic multi-device authentication computing device 801 may provide input, and may also include one or more of a speaker for providing audio output and a video display device for providing textual, audiovisual and/or graphical output. Computing system environment 800 may also include optical scanners (not shown).

Dynamic multi-device authentication computing device 801 may operate in a networked environment supporting connections to one or more remote computing devices, such as computing devices 841 and 851. Computing devices 841 and 851 may be personal computing devices or servers that include any or all of the elements described above relative to dynamic multi-device authentication computing device 801.

The network connections depicted in FIG. 8 may include Local Area Network (LAN) 825 and Wide Area Network (WAN) 829, as well as other networks. When used in a LAN networking environment, dynamic multi-device authentication computing device 801 may be connected to LAN 825 through a network interface or adapter in communications module 809. When used in a WAN networking environment, dynamic multi-device authentication computing device 801 may include a modem in communications module 809 or other means for establishing communications over WAN 829, such as network 831 (e.g., public network, private network, Internet, intranet, and the like). The network connections shown are illustrative and other means of establishing a communications link between the computing devices may be used. Various well-known protocols such as Transmission Control Protocol/Internet Protocol (TCP/IP), Ethernet, File Transfer Protocol (FTP), Hypertext Transfer Protocol (HTTP) and the like may be used, and the system can be operated in a client-server configuration to permit a user to retrieve web pages from a web-based server.

The disclosure is operational with numerous other computing system environments or configurations. Examples of computing systems, environments, and/or configurations that may be suitable for use with the disclosed embodiments include, but are not limited to, personal computers (PCs), server computers, hand-held or laptop devices, smart phones, multiprocessor systems, microprocessor-based systems, set top boxes, programmable consumer electronics, network PCs, minicomputers, mainframe computers, distributed computing environments that include any of the above systems or devices, and the like that are configured to perform the functions described herein.

Figure 9:
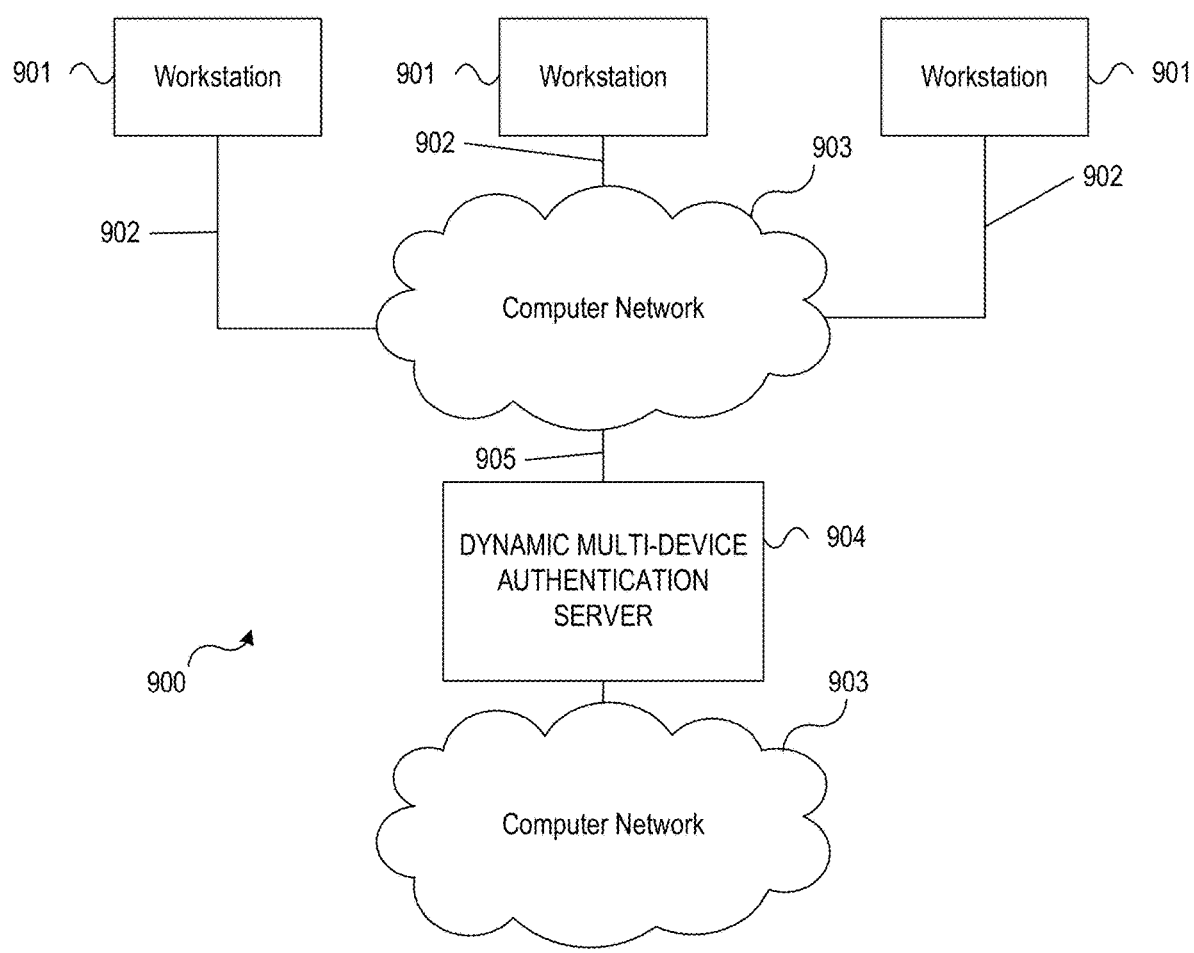
FIG. 9 depicts an illustrative block diagram of workstations and servers that may be used to implement the processes and functions of certain aspects of the present disclosure in accordance with one or more aspects described herein.

FIG. 9 depicts an illustrative block diagram of workstations and servers that may be used to implement the processes and functions of certain aspects of the present disclosure in accordance with one or more example embodiments. Referring to FIG. 9, illustrative system 900 may be used for implementing example embodiments according to the present disclosure. As illustrated, system 900 may include one or more workstation computers 901. Workstation 901 may be, for example, a desktop computer, a smartphone, a wireless device, a tablet computer, a laptop computer, and the like, configured to perform various processes described herein. Workstations 901 may be local or remote, and may be connected by one of communications links 902 to computer network 903 that is linked via communications link 905 to dynamic multi-device authentication server 904. In system 900, dynamic multi-device authentication server 904 may be a server, processor, computer, or data processing device, or combination of the same, configured to perform the functions and/or processes described herein. Server 904 may be used to generate encryption key pairs, generate device keys including cross reference data, generate reference keys, generate authentication codes, receive and process requests for authentication, and the like.

Computer network 903 may be any suitable computer network including the Internet, an intranet, a Wide-Area Network (WAN), a Local-Area Network (LAN), a wireless network, a Digital Subscriber Line (DSL) network, a frame relay network, an Asynchronous Transfer Mode network, a Virtual Private Network (VPN), or any combination of any of the same. Communications links 902 and 905 may be communications links suitable for communicating between workstations 901 and dynamic multi-device authentication server 804, such as network links, dial-up links, wireless links, hard-wired links, as well as network types developed in the future, and the like.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, Application-Specific Integrated Circuits (ASICs), Field Programmable Gate Arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may be and/or include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, one or more steps described with respect to one figure may be used in combination with one or more steps described with respect to another figure, and/or one or more depicted steps may be optional in accordance with aspects of the disclosure.

What is claimed is:

1. A system, comprising:
a plurality of computing devices forming a key network, each computing device of the plurality of computing devices including:
at least one processor;
a communication interface communicatively coupled to the at least one processor; and
memory storing computer-readable instructions that, when executed by the at least one processor, cause one or more computing devices of the plurality of computing devices to:
receive, from a computing platform, a device key including cross reference data, the device key with cross reference data including an entry for each device of the plurality of computing devices forming the key network and each entry for each device including a cell including an authentication value and a cell including a forward reference value;
store the device key including cross reference data;
receive a request to authenticate a computing device of the plurality of computing devices forming the key network;
send a request to the computing platform for a generated reference key, the generated reference key including a plurality of starting points, each starting point having a device identifier and a cell identifier, and a plurality of hop counts corresponding to each starting point and identifying a number of forward advancements to make before capturing an authentication value;
execute a first hop sequence based on the generated reference key, executing the first hop sequence including identifying a first starting point of the plurality of starting points, the first starting point including a first device identifier and a first cell identifier, identifying a first hop count associated with the first starting point and executing a number of hops in the first hop count from the reference key;
after executing the first hop sequence, capturing an authentication value corresponding to a last cell in the first hop sequence;
execute a second hop sequence based on the generated reference key, executing the second hop sequence including identifying a second starting point of the plurality of starting points, the second starting point including a second device identifier and a second cell identifier, identifying a second hop count associated with the second starting point and executing a number of hops in the second hop count from the reference key;
after executing the second hop sequence, capturing an authentication value corresponding to a last cell in the second hop sequence;
generate a comparison authentication code based on the authentication value in the last cell in the first hop sequence and the last cell in the second hop sequence;
transmit the generated comparison authentication code to the computing platform; and
receive, from the computing platform, an indication of authentication of the plurality of computing devices forming the key network based on a comparison of the generated comparison authentication code to a pre-generated authentication code.

2. The system of claim 1, further including instructions that, when executed cause the one or more computing devices to:
convert the comparison authentication code to a hash value; and
transmit the hash value to the computing platform.

3. The system of claim 1, wherein the indication of authentication includes a denial of the request to authenticate based on an outcome of the comparison of the generated comparison authentication code to a pre-generated authentication code including the generated comparison authentication code not matching the pre-generated authentication code.

4. The system of claim 1, wherein the indication of authentication includes authentication of at least one computing device in the key network based on an outcome of the comparison of the generated comparison authentication code to a pre-generated authentication code including the generated comparison authentication code matching the pre-generated authentication code.

5. The system of claim 4, wherein authentication of at least one computing device in the key network further includes authentication of all computing devices in the key network.

6. The system of claim 1, further including instructions that, when executed, cause each computing device of the plurality of computing devices to:
receive, from the computing platform, a private key of an encryption key pair; and
store the private key.

7. The system of claim 1, wherein executing at least one of the first hop sequence and the second hop sequence includes communicating between two or more computing devices of the plurality of computing devices in the key network.

8. A method, comprising:
by at least one computing device of a plurality of computing devices forming a key network, the at least one computing device comprising at least one processor, memory, and a communication interface:
receiving, by the at least one processor and from a computing platform, a device key including cross reference data, the device key with cross reference data including an entry for each device of the plurality of computing devices forming the key network and each entry for each device including a cell including an authentication value and a cell including a forward reference value;
storing, by the at least one processor, the device key including cross reference data;
receiving, by the at least one processor, a request to authenticate a computing device of the plurality of computing devices forming the key network;
sending, by the at least one processor and via the communication interface, a request to the computing platform for a generated reference key, the generated reference key including a plurality of starting points, each starting point having a device identifier and a cell identifier, and a plurality of hop counts corresponding to each starting point and identifying a number of forward advancements to make before capturing an authentication value;
executing, by the at least one processor, a first hop sequence based on the generated reference key, executing the first hop sequence including identifying a first starting point of the plurality of starting points, the first starting point including a first device identifier and a first cell identifier, identifying a first hop count associated with the first starting point and executing a number of hops in the first hop count from the reference key;
after executing the first hop sequence, capturing, by the at least one processor, an authentication value corresponding to a last cell in the first hop sequence;
executing, by the at least one processor, a second hop sequence based on the generated reference key, executing the second hop sequence including identifying a second starting point of the plurality of starting points, the second starting point including a second device identifier and a second cell identifier, identifying a second hop count associated with the second starting point and executing a number of hops in the second hop count from the reference key;
after executing the second hop sequence, capturing, by the at least one processor, an authentication value corresponding to a last cell in the second hop sequence;
generating, by the at least one processor, a comparison authentication code based on the authentication value in the last cell in the first hop sequence and the last cell in the second hop sequence;
transmitting by the at least one processor and via the communication interface, the generated comparison authentication code to the computing platform; and
receiving, by the at least one processor and from the computing platform via the communication interface, an indication of authentication of the plurality of computing devices forming the key network based on a comparison of the generated comparison authentication code to a pre-generated authentication code.

9. The method of claim 8, further including:
converting by the at least one processor, the comparison authentication code to a hash value; and
transmitting, by the at least one processor, the hash value to the computing platform.

10. The method of claim 8, wherein the indication of authentication includes a denial of the request to authenticate based on an outcome of the comparison of the generated comparison authentication code to a pre-generated authentication code including the generated comparison authentication code not matching the pre-generated authentication code.

11. The method of claim 8, wherein the indication of authentication includes authentication of at least one computing device in the key network based on an outcome of the comparison of the generated comparison authentication code to a pre-generated authentication code including the generated comparison authentication code matching the pre-generated authentication code.

12. The method of claim 11, wherein authentication of at least one computing device in the key network further includes authentication of all computing devices in the key network.

13. The method of claim 8, further including:
receive, from the computing platform, a private key of an encryption key pair; and
store the private key.

14. The method of claim 8, wherein executing at least one of the first hop sequence and the second hop sequence includes communicating between two or more computing devices of the plurality of computing devices in the key network.

15. One or more non-transitory computer-readable media storing instructions that, when executed by at least one computing device of a plurality of computing devices forming a key network and including at least one processor, memory, and a communication interface, cause the at least one computing device to:
receive, from a computing platform, a device key including cross reference data, the device key with cross reference data including an entry for each device of the plurality of computing devices forming the key network and each entry for each device including a cell including an authentication value and a cell including a forward reference value;
store the device key including cross reference data;
receive a request to authenticate a computing device of the plurality of computing devices forming the key network;
send a request to the computing platform for a generated reference key, the generated reference key including a plurality of starting points, each starting point having a device identifier and a cell identifier, and a plurality of hop counts corresponding to each starting point and identifying a number of forward advancements to make before capturing an authentication value;
execute a first hop sequence based on the generated reference key, executing the first hop sequence including identifying a first starting point of the plurality of starting points, the first starting point including a first device identifier and a first cell identifier, identifying a first hop count associated with the first starting point and executing a number of hops in the first hop count from the reference key;

after executing the first hop sequence, capturing an authentication value corresponding to a last cell in the first hop sequence;

execute a second hop sequence based on the generated reference key, executing the second hop sequence including identifying a second starting point of the plurality of starting points, the second starting point including a second device identifier and a second cell identifier, identifying a second hop count associated with the second starting point and executing a number of hops in the second hop count from the reference key;

after executing the second hop sequence, capturing an authentication value corresponding to a last cell in the second hop sequence;

generate a comparison authentication code based on the authentication value in the last cell in the first hop sequence and the last cell in the second hop sequence;

transmit the generated comparison authentication code to the computing platform; and receive, from the computing platform, an indication of authentication of the plurality of computing devices forming the key network based on a comparison of the generated comparison authentication code to a pre-generated authentication code.

16. The one or more non-transitory computer-readable media of claim 15, further including instructions that, when executed cause the at least one computing device to:
convert the comparison authentication code to a hash value; and
transmit the hash value to the computing platform.

17. The one or more non-transitory computer-readable media of claim 15, wherein the indication of authentication includes a denial of the request to authenticate based on an outcome of the comparison of the generated comparison authentication code to a pre-generated authentication code including the generated comparison authentication code not matching the pre-generated authentication code.

18. The one or more non-transitory computer-readable media of claim 15, wherein the indication of authentication includes authentication of at least one computing device in the key network based on an outcome of the comparison of the generated comparison authentication code to a pre-generated authentication code including the generated comparison authentication code matching the pre-generated authentication code.

19. The one or more non-transitory computer-readable media of claim 18, wherein authentication of at least one computing device in the key network further includes authentication of all computing devices in the key network.

20. The one or more non-transitory computer-readable media of claim 15, further including instructions that, when executed, cause the at least one computing device to:
receive, from the computing platform, a private key of an encryption key pair; and
store the private key.

21. The one or more non-transitory computer-readable media of claim 15, wherein executing at least one of the first hop sequence and the second hop sequence includes communicating between two or more computing devices of the plurality of computing devices in the key network.

* * * * *

UNITED STATES PATENT AND TRADEMARK OFFICE
CERTIFICATE OF CORRECTION

PATENT NO.           : 10,848,469 B1                                            Page 1 of 1
APPLICATION NO.      : 16/423648
DATED                : November 24, 2020
INVENTOR(S)          : Yarabolu et al.

It is certified that error appears in the above-identified patent and that said Letters Patent is hereby corrected as shown below:

On the Title Page

Column 1, (22) Filed, Line 1:
After "2019", insert --¶(65) Prior Publication Data
US 2020/0382479 A1 Dec. 3, 2020--

<div style="text-align: right;">
Signed and Sealed this
Twenty-seventh Day of April, 2021

Drew Hirshfeld
*Performing the Functions and Duties of the*
*Under Secretary of Commerce for Intellectual Property and*
*Director of the United States Patent and Trademark Office*
</div>